United States Patent
Durkee et al.

(10) Patent No.: US 12,542,332 B2
(45) Date of Patent: Feb. 3, 2026

(54) BATTERY VENTILATION SYSTEMS AND METHODS

(71) Applicant: Lyft, Inc., San Francisco, CA (US)

(72) Inventors: Paul Young Durkee, Pacifica, CA (US); Andrew Dalzell Titus, San Francisco, CA (US)

(73) Assignee: Lyft, Inc., San Francisco, CA (US)

( * ) Notice: Subject to any disclaimer, the term of this patent is extended or adjusted under 35 U.S.C. 154(b) by 1261 days.

(21) Appl. No.: 17/130,780

(22) Filed: Dec. 22, 2020

(65) Prior Publication Data

US 2022/0200093 A1 Jun. 23, 2022

(51) Int. Cl.
*H01M 50/308* (2021.01)
*H01M 50/325* (2021.01)

(52) U.S. Cl.
CPC ....... *H01M 50/308* (2021.01); *H01M 50/325* (2021.01); *H01M 2220/20* (2013.01)

(58) Field of Classification Search
None
See application file for complete search history.

(56) References Cited

U.S. PATENT DOCUMENTS

| | | | |
|---|---|---|---|
| 6,376,119 B1 * | 4/2002 | Nann | H01M 50/308 429/89 |
| 2012/0231306 A1 * | 9/2012 | Herron | H01M 50/342 429/53 |
| 2016/0068224 A1 * | 3/2016 | Rasmussen | B60L 1/003 429/83 |

FOREIGN PATENT DOCUMENTS

KR 101207885 B1 * 12/2012

OTHER PUBLICATIONS

Machine translation of KR101207885B1, Choi, Fixing device of battery in electric bicycle, 2012 (Year: 2012).*

* cited by examiner

*Primary Examiner* — Jonathan G Leong
*Assistant Examiner* — Taeyoung Son
(74) *Attorney, Agent, or Firm* — Baker Botts L.L.P.

(57) ABSTRACT

Systems and methods associated with a battery for a micromobility transit vehicle are provided. A micromobility transit vehicle may include a frame and a battery disposed at least partially in the frame. The battery may include a housing and a ventilation assembly. The ventilation assembly may include a vent cap releasably coupled to the housing, and a breather plug connected to the vent cap and including a membrane configured to pass air between the housing and an external environment, such as to equalize a pressure within the housing with an external environment. The vent cap may be configured to mechanically release from the housing to vent internal gases out of the battery in response to a pressure within the housing, such as in response to a pressure exceeding a threshold.

20 Claims, 26 Drawing Sheets

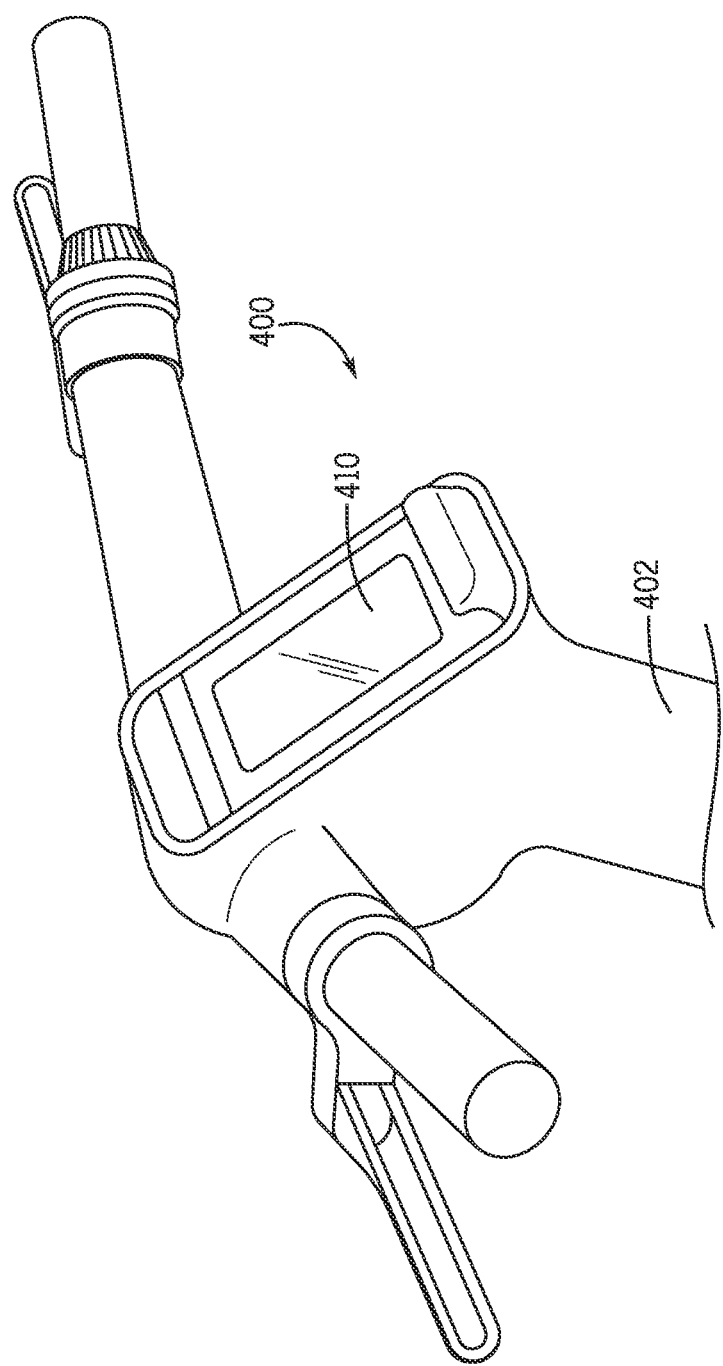

BATTERY VENTILATION SYSTEMS AND METHODS

TECHNICAL FIELD

One or more embodiments of the present disclosure relate generally to micromobility transit vehicles and more particularly, for example, to systems and methods for ventilating a battery for a micromobility transit vehicle.

BACKGROUND

Legacy batteries for micromobility vehicles for hire (e.g., shared scooters, sit-scooters, bicycles, etc.) are often sealed. In such designs, damage to the battery, such as caused by battery cell failure, battery cell damage, high thermal events, etc., can produce or release gases internal to the sealed battery. High internal pressures may cause the battery to rupture, which may cause damage to other vehicle components or other harm.

Therefore, there is a need in the art for systems and methods for battery ventilation that addresses the deficiencies noted above, other deficiencies known in the industry, or at least offers an alternative to current techniques. For example, improvements are needed to allow internal gases of a battery to vent in a controlled manner.

SUMMARY

Techniques are disclosed associated with battery ventilation systems and methods for a micromobility transit vehicle. In accordance with one or more embodiments, a micromobility transit vehicle is provided. The micromobility transit vehicle may include a frame including a downtube, a battery disposed at least partially in the downtube and including a housing and a ventilation assembly. The ventilation assembly may include a vent cap releasably coupled to the housing and a breather plug connected to the vent cap and including a membrane. The membrane may be configured to pass air between the housing and an external environment, such as to equalize a pressure within the housing with the external environment. The vent cap may be configured to mechanically release from the hosing to vent internal gases out of the battery in response to a pressure within the housing, such as in response to the pressure within the housing exceeding a threshold.

In accordance with one or more embodiments, a battery for a micromobility transit vehicle is provided. The battery may include a housing and a ventilation assembly disposed in the housing. The ventilation assembly may include a vent cap and a breather plug. The vent cap may be releasably coupled to the housing. The breather plug may be connected to the vent cap and include a membrane configured to pass air between the housing and an external environment to equalize a pressure within the housing with the external environment. The vent cap may be configured to mechanically release from the housing to vent internal gases out of the battery in response to the pressure within the housing exceeding a threshold.

In accordance with one or more embodiments, a method is provided. The method may include passing air between a housing of a battery and an external environment via a membrane of a ventilation assembly, such as to equalize a pressure within the housing with the external environment. The method may include mechanically releasing a vent cap of the ventilation assembly from the housing to vent internal gases out of the battery in response to a pressure within the housing, such as in response to the pressure within the housing exceeding a threshold. The method may include directing the vented internal gases at least partially through a frame of the micromobility transit vehicle.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

FIG. 4 illustrates a diagram of a user interface associated with a micromobility transit vehicle in accordance with an embodiment of the disclosure.

Embodiments of the invention and their advantages are best understood by referring to the detailed description that follows. It should be appreciated that like reference numerals are used to identify like elements illustrated in one or more of the figures.

DETAILED DESCRIPTION

In accordance with various embodiments of the present disclosure, a battery for a micromobility transit vehicle is provided. The battery may include a housing (e.g., an end cap) with a ventilation assembly allowing airflow across its structure to relieve or balance internal pressure of the battery. For instance, the ventilation assembly may relieve internal pressure of the battery, such as caused from a thermal event (e.g., battery cell failure), high pressure differentials to ambient conditions, or other events and conditions. The ventilation assembly is a passive system designed to safely relieve the internal pressure. In embodiments, the ventilation assembly may mechanically release under pressure to vent internal gases out of the battery. The battery may include air pockets above and below the battery cell block to allow for gas to travel to the ventilation assembly.

The ventilation assembly may direct internal gases away from a rider of the micromobility transit vehicle. For instance, the ventilation assembly may be positioned to vent gases downward and/or rearward, such as through a downtube, a bottom bracket, or other portion of the vehicle frame towards the ground. In embodiments, the frame may include venting features or structures to direct vented gases as desired. For example, the frame may include one or more exhaust paths.

The ventilation assembly may include a vent cap and a breather plug. The vent cap is releasably coupled to the battery, such as to an end cap of the battery's housing. The vent cap may include a snap fitting that connects the vent cap to the battery. The snap fitting may release under pressure, such as at a threshold internal pressure of the battery, causing the vent cap to pop out of the battery. The vent cap may be designed to pop under a pressure event, such as caused from one or multiple battery cell failures. The vent cap may be reinserted or reset after an event. The vent cap may be sealed to the end cap with a vent cap seal (e.g., an O-ring).

The breather plug may be connected to the vent cap and allow airflow during normal operation to balance pressure. The breather plug may include a membrane that allows a slow transfer of air, such that in a thermal event the pressure will build up inside the battery to cause the vent cap to release. In embodiments, the breather plug may release from the vent cap, such as under battery cell failure. The breather plug may be sealed to the vent cap with a breather plug seal (e.g., an O-ring).

Figure 1:
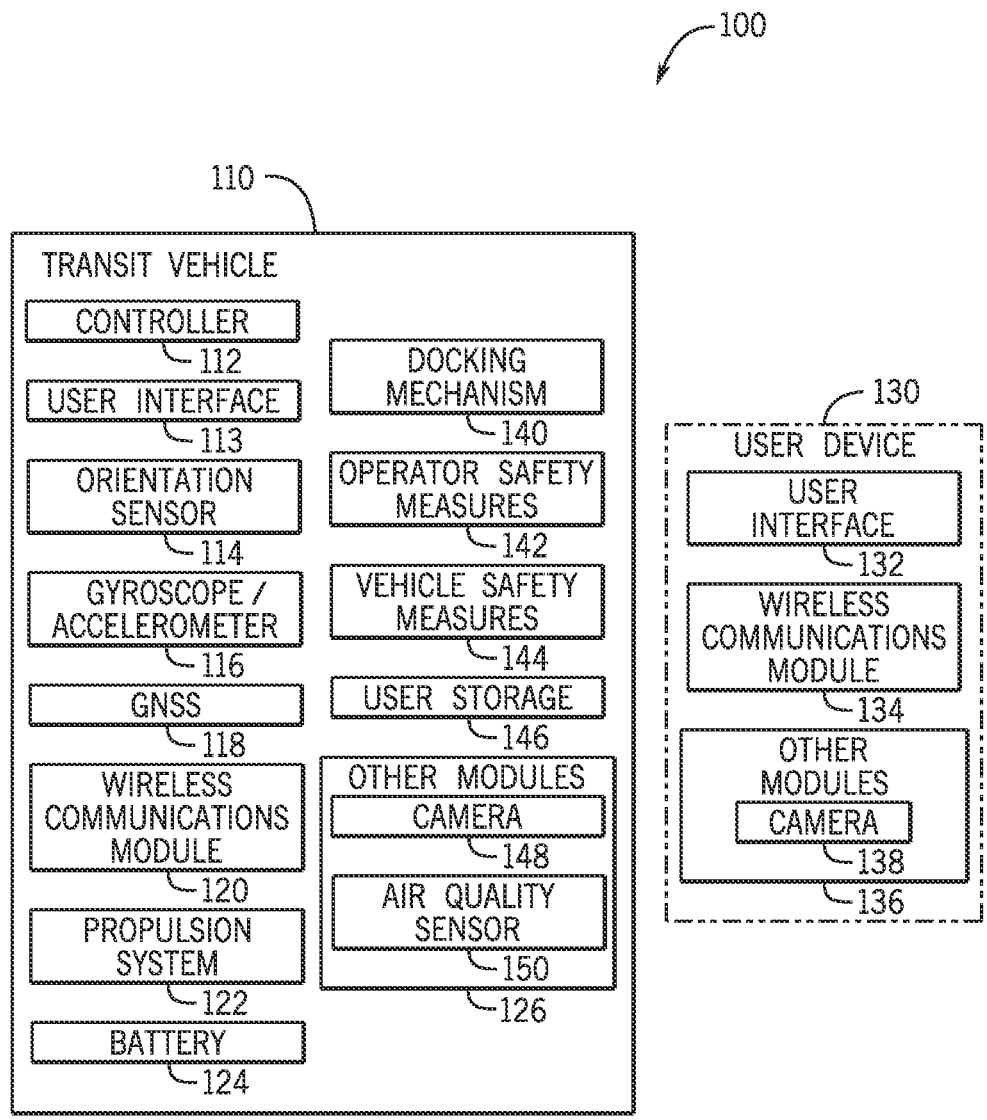
FIG. 1 illustrates a block diagram of a portion of a dynamic transportation matching system including a transit vehicle in accordance with an embodiment of the disclosure.

FIG. 1 illustrates a block diagram of a portion of a dynamic transportation matching system 100 (e.g., system 100) including a transit vehicle 110 in accordance with an embodiment of the disclosure. In the embodiment shown in FIG. 1, system 100 includes transit vehicle 110 and optionally a user device 130. In general, transit vehicle 110 may be a passenger vehicle designed to transport a single person (e.g., a micromobility transit vehicle, a transit bike and scooter vehicle, or the like) or a group of people (e.g., a typical car or truck). More specifically, transit vehicle 110 may be implemented as a motorized or electric kick scooter, bicycle, and/or motor scooter designed to transport one or perhaps two people at once typically on a paved road (collectively, micromobility transit vehicles), as a typical automobile configured to transport up to 4, 7, or 10 people at once, or according to a variety of different transportation modalities (e.g., transportation mechanisms). Transit vehicles similar to transit vehicle 110 may be owned, managed, and/or serviced primarily by a fleet manager/servicer providing transit vehicle 110 for rental and use by the public as one or more types of transportation modalities offered by a dynamic transportation matching system, for example. In some embodiments, transit vehicles similar to transit vehicle 110 may be owned, managed, and/or serviced by a private owner using the dynamic transportation matching system to match their vehicle to a transportation request, such as with ridesharing or ridesourcing applications typically executed on a mobile user device, such as user device 130 as described herein. User device 130 may be a smartphone, tablet, near field communication (NFC) or radio-frequency identification (RFID) enabled smart card, or other personal or portable computing and/or communication device that may be used to facilitate rental and/or operation of transit vehicle 110.

As shown in FIG. 1, transit vehicle 110 may include one or more of a controller 112, a user interface 113, an orientation sensor 114, a gyroscope/accelerometer 116, a global navigation satellite system (GNSS) receiver 118, a wireless communications module 120, a camera 148, a propulsion system 122, an air quality sensor 150, and other modules 126. Operation of transit vehicle 110 may be substantially manual, autonomous, and/or partially or completely controlled by user device 130, which may include one or more of a user interface 132, a wireless communications module 134, a camera 138, and other modules 136. In other embodiments, transit vehicle 110 may include any one or more of the elements of user device 130. In some embodiments, one or more of the elements of system 100 may be implemented in a combined housing or structure that can be coupled to or within transit vehicle 110 and/or held or carried by a user of system 100, such as a transportation requester or rider.

Controller 112 may be implemented as any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a control loop for controlling various operations of transit vehicle 110 and/or other elements of system 100, for example. Such software instructions may also implement methods for processing images and/or other sensor signals or data, determining sensor information, providing user feedback (e.g., through user interface 113 or 132), querying devices for operational parameters, selecting operational parameters for devices, or performing any of the various operations described herein (e.g., operations performed by logic devices of various devices of system 100).

In addition, a non-transitory medium may be provided for storing machine readable instructions for loading into and execution by controller 112. In these and other embodiments, controller 112 may be implemented with other components where appropriate, such as volatile memory, non-volatile memory, one or more interfaces, and/or various analog and/or digital components for interfacing with devices of system 100. For example, controller 112 may be adapted to store sensor signals, sensor information, parameters for coordinate frame transformations, calibration parameters, sets of calibration points, and/or other operational parameters, over time, for example, and provide such stored data to a transportation requester or rider via user interface 113 or 132. In some embodiments, controller 112 may be integrated with one or more other elements of transit vehicle 110, for example, or distributed as multiple logic devices within transit vehicle 110 and/or user device 130.

In some embodiments, controller 112 may be configured to substantially continuously monitor and/or store the status of and/or sensor data provided by one or more elements of transit vehicle 110 and/or user device 130, such as the position and/or orientation of transit vehicle 110 and/or user device 130, for example, and the status of a communication link established between transit vehicle 110 and/or user device 130. Such communication links may be established and then provide for transmission of data between elements of system 100 substantially continuously throughout operation of system 100, where such data includes various types of sensor data, control parameters, and/or other data.

User interface 113 of transit vehicle 110 may be implemented as one or more of a display, a touch screen, a keyboard, a mouse, a joystick, a knob, a steering wheel, a yoke, and/or any other device capable of accepting user input and/or providing feedback to a user. In various embodiments, user interface 113 may be adapted to provide user input (e.g., as a type of signal and/or sensor information transmitted by wireless communications module 134 of user device 130) to other devices of system 100, such as controller 112. User interface 113 may also be implemented with one or more logic devices (e.g., similar to controller 112) that may be adapted to store and/or execute instructions, such as software instructions, implementing any of the various processes and/or methods described herein. For example, user interface 113 may be adapted to form communication links, transmit and/or receive communications (e.g., infrared images and/or other sensor signals, control signals, sensor information, user input, and/or other information), for example, or to perform various other processes and/or methods described herein.

In one embodiment, user interface 113 may be adapted to display a time series of various sensor information and/or other parameters as part of or overlaid on a graph or map, which may be referenced to a position and/or orientation of transit vehicle 110 and/or other elements of system 100. For example, user interface 113 may be adapted to display a time series of positions, headings, and/or orientations of transit vehicle 110 and/or other elements of system 100 overlaid on a geographical map, which may include one or more graphs indicating a corresponding time series of actuator control signals, sensor information, and/or other sensor and/or control signals. In some embodiments, user interface 113 may be adapted to accept user input including a user-defined target heading, waypoint, route, and/or orientation, for example, and to generate control signals to cause transit vehicle 110 to move according to the target heading, route, and/or orientation. In other embodiments, user interface 113 may be adapted to accept user input modifying a control loop parameter of controller 112, for example.

Orientation sensor 114 may be implemented as one or more of a compass, float, accelerometer, and/or other device capable of measuring an orientation of transit vehicle 110 (e.g., magnitude and direction of roll, pitch, and/or yaw, relative to one or more reference orientations such as gravity and/or Magnetic North), camera 148, and/or other elements of system 100, and providing such measurements as sensor signals and/or data that may be communicated to various devices of system 100. Gyroscope/accelerometer 116 may be implemented as one or more electronic sextants, semiconductor devices, integrated chips, accelerometer sensors, accelerometer sensor systems, or other devices capable of measuring angular velocities/accelerations and/or linear accelerations (e.g., direction and magnitude) of transit vehicle 110 and/or other elements of system 100 and providing such measurements as sensor signals and/or data that may be communicated to other devices of system 100 (e.g., user interface 132, controller 112).

GNSS receiver 118 may be implemented according to any global navigation satellite system, including a GPS, GLONASS, and/or Galileo based receiver and/or other device capable of determining absolute and/or relative position of transit vehicle 110 (e.g., or an element of transit vehicle 110) based on wireless signals received from space-born and/or terrestrial sources (e.g., eLoran, and/or other at least partially terrestrial systems), for example, and capable of providing such measurements as sensor signals and/or data (e.g., coordinates) that may be communicated to various devices of system 100. In some embodiments, GNSS receiver 118 may include an altimeter, for example, or may be used to provide an absolute altitude.

Wireless communications module 120 may be implemented as any wireless communications module configured to transmit and receive analog and/or digital signals between elements of system 100. For example, wireless communications module 120 may be configured to directly or indirectly receive control signals and/or data from user device 130 and provide them to controller 112 and/or propulsion system 122. In other embodiments, wireless communications module 120 may be configured to receive images and/or other sensor information (e.g., still images or video images) and relay the sensor data to controller 112 and/or user device 130. In some embodiments, wireless communications module 120 may be configured to support spread spectrum transmissions, for example, and/or multiple simultaneous communications channels between elements of system 100. Wireless communication links formed by wireless communications module 120 may include one or more analog and/or digital radio communication links, such as WiFi, Bluetooth, NFC, RFID, and others, as described herein, and may be direct communication links established between elements of system 100, for example, or may be relayed through one or more wireless relay stations configured to receive and retransmit wireless communications. In various embodiments, wireless communications module 120 may be configured to support wireless mesh networking, as described herein.

In some embodiments, wireless communications module 120 may be configured to be physically coupled to transit vehicle 110 and to monitor the status of a communication link directly or indirectly established between transit vehicle 110 and/or user device 130. Such status information may be provided to controller 112, for example, or transmitted to other elements of system 100 for monitoring, storage, or further processing, as described herein. In addition, wireless communications module 120 may be configured to determine a range to another device, such as based on time of flight, and provide such range to the other device and/or controller 112. Communication links established by communication module 120 may be configured to transmit data between elements of system 100 substantially continuously throughout operation of system 100, where such data includes various types of sensor data, control parameters, and/or other data, as described herein.

Propulsion system 122 may be implemented as one or more motor-based propulsion systems, and/or other types of propulsion systems that can be used to provide motive force to transit vehicle 110 and/or to steer transit vehicle 110. In some embodiments, propulsion system 122 may include elements that can be controlled (e.g., by controller 112 and/or user interface 113) to provide motion for transit vehicle 110 and to provide an orientation for transit vehicle 110. In various embodiments, propulsion system 122 may be implemented with a portable power supply, such as a battery. In some embodiments, propulsion system 122 may be implemented with a combustion engine/generator and fuel supply.

For example, in some embodiments, such as when propulsion system 122 is implemented by an electric motor (e.g., as with many micromobility transit vehicles), transit vehicle 110 may include battery 124. Battery 124 may be implemented by one or more battery cells (e.g., lithium ion battery cells) and be configured to provide electrical power to propulsion system 122 to propel transit vehicle 110, for example, as well as to various other elements of system 100, including controller 112, user interface 113, and/or wireless communications module 120. In some embodiments, battery 124 may be implemented with its own safety measures, such as thermal interlocks and a fire-resistant enclosure, for example, and may include one or more logic devices, sensors, and/or a display to monitor and provide visual feedback of a charge status of battery 124 (e.g., a charge percentage, a low charge indicator, etc.).

Other modules 126 may include other and/or additional sensors, actuators, communications modules/nodes, and/or user interface devices, for example, and may be used to provide additional environmental information related to operation of transit vehicle 110, for example. In some embodiments, other modules 126 may include a humidity sensor, a wind and/or water temperature sensor, a barometer, an altimeter, a radar system, a proximity sensor, a visible spectrum camera or infrared camera (with an additional mount), and/or other environmental sensors providing measurements and/or other sensor signals that can be displayed to a transportation requester or rider and/or used by other devices of system 100 (e.g., controller 112) to provide operational control of transit vehicle 110 and/or system 100. In further embodiments, other modules 126 may include a light, such as a head light or indicator light, and/or an audible alarm, both of which may be activated to alert passersby to possible theft, abandonment, and/or other critical statuses of transit vehicle 110. In particular, and as shown in FIG. 1, other modules 126 may include camera 148 and/or air quality sensor 150.

Camera 148 may be implemented as an imaging device including an imaging module including an array of detector elements that can be arranged in a focal plane array. In various embodiments, camera 148 may include one or more logic devices (e.g., similar to controller 112) that can be configured to process imagery captured by detector elements of camera 148 before providing the imagery to communications module 120. More generally, camera 148 may be configured to perform any of the operations or methods described herein, at least in part, or in combination with controller 112 and/or user interface 113 or 132.

In various embodiments, air quality sensor 150 may be implemented as an air sampling sensor configured to determine an air quality of an environment about transit vehicle 110 and provide corresponding air quality sensor data. Air quality sensor data provided by air quality sensor 150 may include particulate count, methane content, ozone content, and/or other air quality sensor data associated with common street level sensitivities and/or health monitoring typical when in a street level environment, such as that experienced when riding on a typical micromobility transit vehicle, as described herein.

Transit vehicles implemented as micromobility transit vehicles may include a variety of additional features designed to facilitate fleet management and rider and environmental safety. For example, as shown in FIG. 1, transit vehicle 110 may include one or more of docking mechanism 140, operator safety measures 142, vehicle security device 144, and/or user storage 146, as described in more detail herein by reference to FIGS. 3A-C.

User interface 132 of user device 130 may be implemented as one or more of a display, a touch screen, a keyboard, a mouse, a joystick, a knob, a steering wheel, a yoke, and/or any other device capable of accepting user input and/or providing feedback to a user, such as a transportation requester or rider. In various embodiments, user interface 132 may be adapted to provide user input (e.g., as a type of signal and/or sensor information transmitted by wireless communications module 134 of user device 130) to other devices of system 100, such as controller 112. User interface 132 may also be implemented with one or more logic devices (e.g., similar to controller 112) that may be adapted to store and/or execute instructions, such as software instructions, implementing any of the various processes and/or methods described herein. For example, user interface 132 may be adapted to form communication links, transmit and/or receive communications (e.g., infrared images and/or other sensor signals, control signals, sensor information, user input, and/or other information), for example, or to perform various other processes and/or methods described herein.

In one embodiment, user interface 132 may be adapted to display a time series of various sensor information and/or other parameters as part of or overlaid on a graph or map, which may be referenced to a position and/or orientation of transit vehicle 110 and/or other elements of system 100. For example, user interface 132 may be adapted to display a time series of positions, headings, and/or orientations of transit vehicle 110 and/or other elements of system 100 overlaid on a geographical map, which may include one or more graphs indicating a corresponding time series of actuator control signals, sensor information, and/or other sensor and/or control signals. In some embodiments, user interface 132 may be adapted to accept user input including a user-defined target heading, waypoint, route, and/or orientation, for example, and to generate control signals to cause transit vehicle 110 to move according to the target heading, route, and/or orientation. In other embodiments, user interface 132 may be adapted to accept user input modifying a control loop parameter of controller 112, for example.

Wireless communications module 134 may be implemented as any wireless communications module configured to transmit and receive analog and/or digital signals between elements of system 100. For example, wireless communications module 134 may be configured to directly or indirectly transmit control signals from user interface 132 to wireless communications module 120 or 134. In some embodiments, wireless communications module 134 may be configured to support spread spectrum transmissions, for example, and/or multiple simultaneous communications channels between elements of system 100. In various embodiments, wireless communications module 134 may be configured to monitor the status of a communication link established between user device 130 and/or transit vehicle 110 (e.g., including packet loss of transmitted and received data between elements of system 100, such as with digital communication links), and/or determine a range to another device, as described herein. Such status information may be provided to user interface 132, for example, or transmitted to other elements of system 100 for monitoring, storage, or further processing, as described herein. In various embodiments, wireless communications module 134 may be configured to support wireless mesh networking, as described herein.

Other modules 136 of user device 130 may include other and/or additional sensors, actuators, communications modules/nodes, and/or user interface devices used to provide additional environmental information associated with user device 130, for example. In some embodiments, other modules 136 may include a humidity sensor, a wind and/or water temperature sensor, a barometer, a radar system, a visible spectrum camera, an infrared camera, a GNSS receiver, and/or other environmental sensors providing measurements and/or other sensor signals that can be displayed to a transportation requester or rider and/or used by other devices of system 100 (e.g., controller 112) to provide operational control of transit vehicle 110 and/or system 100 or to process sensor data to compensate for environmental conditions. As shown in FIG. 1, other modules 136 may include camera 138.

Camera 138 may be implemented as an imaging device including an imaging module including an array of detector elements that can be arranged in a focal plane array. In various embodiments, camera 138 may include one or more logic devices (e.g., similar to controller 112) that can be configured to process imagery captured by detector elements of camera 138 before providing the imagery to communications module 120. More generally, camera 138 may be configured to perform any of the operations or methods described herein, at least in part, or in combination with controller 138 and/or user interface 113 or 132.

In general, each of the elements of system 100 may be implemented with any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a method for providing sensor data and/or imagery, for example, or for transmitting and/or receiving communications, such as sensor signals, sensor information, and/or control signals, between one or more devices of system 100.

In addition, one or more non-transitory mediums may be provided for storing machine readable instructions for loading into and execution by any logic device implemented with one or more of the devices of system 100. In these and other embodiments, the logic devices may be implemented with other components where appropriate, such as volatile memory, non-volatile memory, and/or one or more interfaces (e.g., inter-integrated circuit (I2C) interfaces, mobile industry processor interfaces (MIPI), joint test action group (JTAG) interfaces (e.g., IEEE 1149.1 standard test access port and boundary-scan architecture), and/or other interfaces, such as an interface for one or more antennas, or an interface for a particular type of sensor).

Sensor signals, control signals, and other signals may be communicated among elements of system 100 and/or elements of other systems similar to system 100 using a variety of wired and/or wireless communication techniques, including voltage signaling, Ethernet, WiFi, Bluetooth, Zigbee, Xbee, Micronet, Near-field Communication (NFC) or other medium and/or short range wired and/or wireless networking protocols and/or implementations, for example. In such embodiments, each element of system 100 may include one or more modules supporting wired, wireless, and/or a combination of wired and wireless communication techniques, including wireless mesh networking techniques. In some embodiments, various elements or portions of elements of system 100 may be integrated with each other, for example, or may be integrated onto a single printed circuit board (PCB) to reduce system complexity, manufacturing costs, power requirements, coordinate frame errors, and/or timing errors between the various sensor measurements.

Each element of system 100 may include one or more batteries, capacitors, or other electrical power storage devices, for example, and may include one or more solar cell modules or other electrical power generating devices. In some embodiments, one or more of the devices may be powered by a power source for transit vehicle 110, using one or more power leads. Such power leads may also be used to support one or more communication techniques between elements of system 100.

Figure 2:
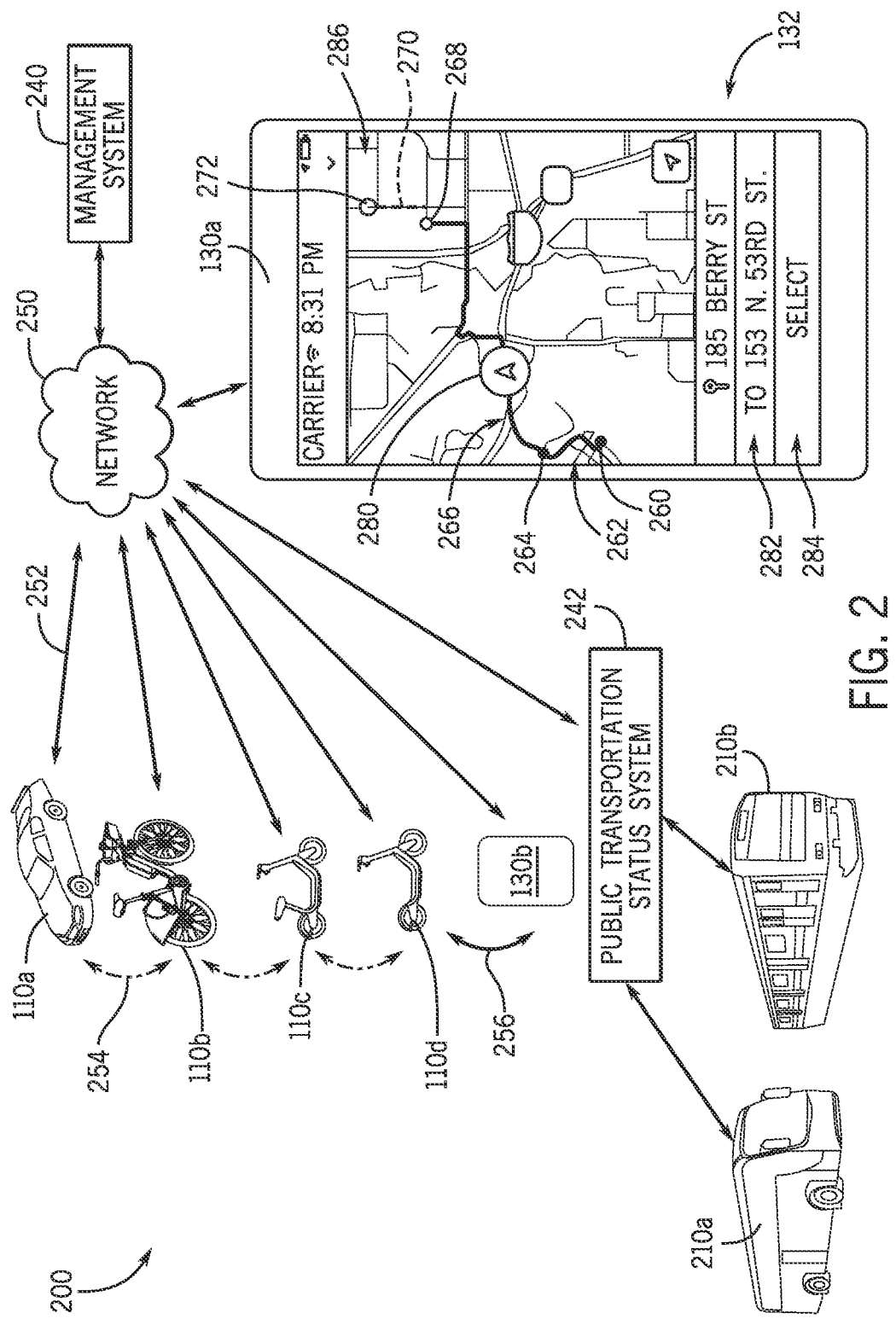
FIG. 2 illustrates a block diagram of a dynamic transportation matching system incorporating a variety of transportation modalities in accordance with an embodiment of the disclosure.

FIG. 2 illustrates a block diagram of a dynamic transportation matching system 200 (or multimodal transportation system) incorporating a variety of transportation modalities in accordance with an embodiment of the disclosure. For example, as shown in FIG. 2, dynamic transportation matching system 200 may include multiple embodiments of system 100. In the embodiment shown in FIG. 2, dynamic transportation matching system 200 includes a management system/server 240 in communication with a number of transit vehicles 110a-d and user devices 130a-b over a combination of a typical wide area network (WAN) 250, WAN communication links 252 (solid lines), a variety of mesh network communication links 254 (curved dashed lines), and NFC, RFID, and/or other local communication links 256 (curved solid lines). Dynamic transportation matching system 200 also includes a public transportation status system 242 in communication with a variety of public transportation vehicles, including one or more buses 210a, trains 210b, and/or other public transportation modalities, such as ships, ferries, light rail, subways, streetcars, trolleys, cable cars, monorails, tramways, and aircraft. As shown in FIG. 2, all transit vehicles are able to communicate directly to WAN 250 and, in some embodiments, may be able to communicate across mesh network communication links 254, to convey fleet data and/or fleet status data amongst themselves and/or to and from management system 240.

In FIG. 2, user device 130a may receive an input with a request for transportation with one or more transit vehicles 110a-d and/or public transportation vehicles 210a-b. For example, the transportation request may be a request to use (e.g., hire or rent) one of transit vehicles 110a-d. The transportation request may be transmitted to management system 240 over WAN 250, allowing management system 240 to poll status of transit vehicles 110a-d and to select one of transit vehicles 110a-d to fulfill the transportation request. Upon or after one of the transit vehicles 110a-d is selected to fulfill the transportation request, a fulfillment notice from management system 240 and/or from the selected transit vehicle 110a-d may be transmitted to the user device 130a. In some embodiments, navigation instructions to proceed to or otherwise meet with the selected transit vehicle 110a-d may be sent to the user device 130a. A similar process may occur using user device 130b, but where the transportation request enables a transit vehicle over a local communication link 256, as shown.

Management system 240 may be implemented as a server with controllers, user interfaces, communications modules, and/or other elements similar to those described with respect to system 100 of FIG. 1, but with sufficient processing and storage resources to manage operation of dynamic transportation matching system 200, including monitoring statuses of transit vehicles 110a-d, as described herein. In some embodiments, management system 240 may be implemented in a distributed fashion and include multiple separate server embodiments linked communicatively to each other direction and/or through WAN 250. WAN 250 may include one or more of the Internet, a cellular network, and/or other wired or wireless WANs. WAN communication links 252 may be wired or wireless WAN communication links, and mesh network communication links 254 may be wireless communication links between and among transit vehicles 110a-d, as described herein.

User device 130a in FIG. 2 includes a display of user interface 132 that shows a planned route for a transportation requester or rider attempting to travel from an origination point 260 to a destination 272 using different transportation modalities (e.g., a planned multimodal route), as depicted in a route/street map 286 rendered by user interface 132. For example, management system 240 may be configured to monitor statuses of all available transportation modalities (e.g., including transit vehicles and public transportation vehicles) and provide a planned multimodal route from origination point 260 to destination 272. Such a planned multimodal route may include, for example, a walking route 262 from origination point 260 to a bus stop 264, a bus route 266 from bus stop 264 to a bus stop 268 (e.g., using one or more of transit vehicles 210a or 210b), and a micromobility route 270 (e.g., using one or more of micromobility transit vehicles 110b, 110c, or 110d) from bus stop 268 to destination 272. Also shown rendered by user interface 132 are a present location indicator 280 (indicating a present absolute position of user device 130a on street map 286), a navigation destination selector/indicator 282 (e.g., configured to allow a transportation requester or rider to input a desired navigation destination), and a notice window 284 (e.g., used to render vehicle status data or other information, including user notices and/or alerts, as described herein). For example, a transportation requester or rider may use navigation destination selector/indicator 282 to provide and/or change destination 272, as well as change any portion (e.g., leg, route, etc.) or modality of the multimodal route from origination point 260 to destination 272. In some embodiments, notice window 284 may display instructions for traveling to a next waypoint along the determined multimodal route (e.g., directions to walk to a bus stop, directions to ride a micromobility transit vehicle to a next stop along the route, etc.).

In various embodiments, management system 240 may be configured to provide or suggest an optimal multimodal route to a transportation requester or rider (e.g., initially and/or while traversing a particular planned route), and a transportation requester or rider may select or make changes to such a route through manipulation of user device 130a, as shown. For example, management system 240 may be configured to suggest a quickest route, a least expensive route, a most convenient route (to minimize modality changes or physical actions a transportation requester or rider must take along the route), an inclement weather route (e.g., that keeps the transportation requester or rider protected from inclement weather a maximum amount of time during route traversal), or some combination of those that is determined as best suited to the transportation requester or rider, such as based on various user preferences. Such preferences may be based on prior use of system 200, prior user trips, a desired arrival time and/or departure time (e.g., based on user input or obtained through a user calendar or other data source), or specifically input or set by a user (e.g., a transportation requester or rider) for the specific route, for example, or in general. In one example, origination point 260 may be extremely congested or otherwise hard to access by a ride-share transit vehicle, which could prevent or significantly increase a wait time for the transportation requester or rider and a total trip time to arrive at destination 272. In such circumstances, a planned multimodal route may include directing the transportation requester or rider to walk and/or take a scooter/bike to an intermediate and less congested location to meet a reserved ride-share vehicle, which would allow the transportation requester or rider to arrive at destination 272 quicker than if the ride-share vehicle was forced to meet the transportation requester or rider at origination point 260. It will be appreciated that numerous different transportation-relevant conditions may exist or dynamically appear or disappear along a planned route that may make it beneficial to use different modes of transportation to arrive at destination 272 efficiently, including changes in traffic congestion and/or other transportation-relevant conditions that occur mid-route, such as an accident along the planned route. Under such circumstances, management system 240 may be configured to adjust a modality or portion of the planned route dynamically in order to avoid or otherwise compensate for the changed conditions while the route is being traversed.

Figure 3A:
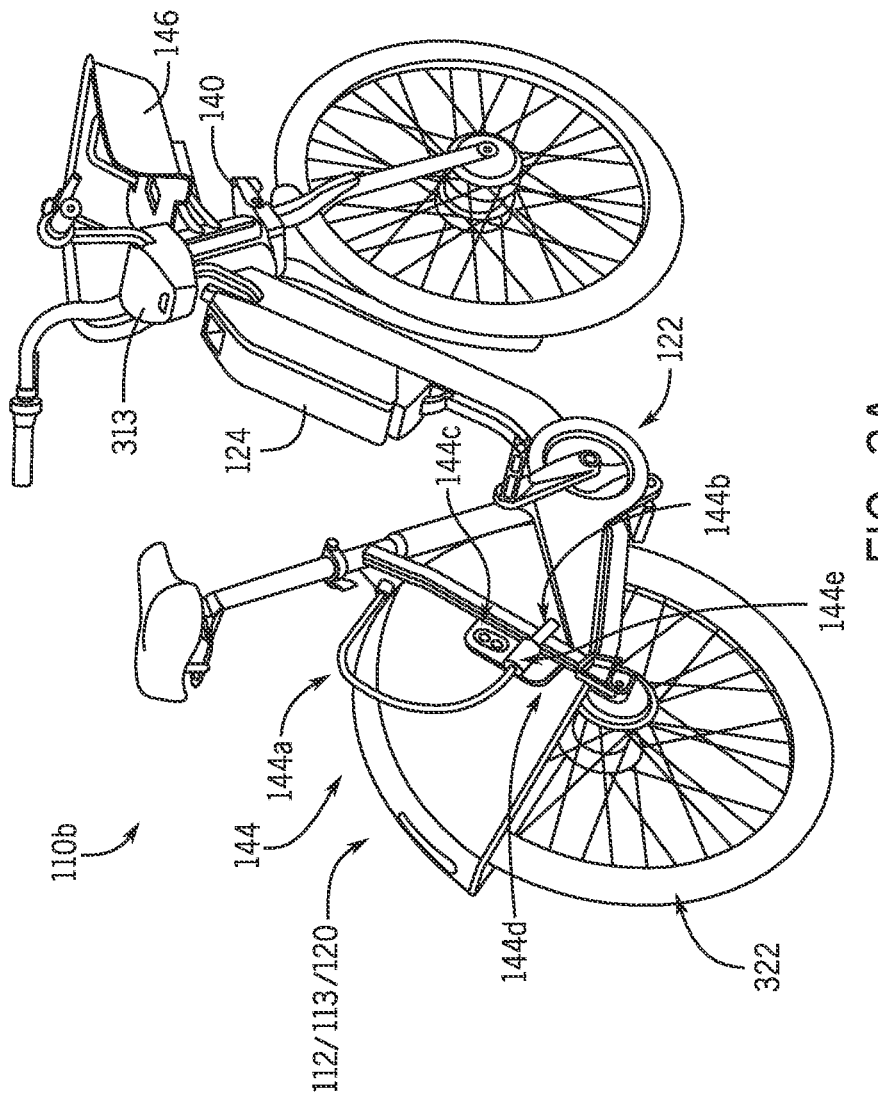
FIGS. 3A, 3B, and 3C illustrate respective diagrams of micromobility transit vehicles for use in a dynamic transportation matching system in accordance with an embodiment of the disclosure.
Figure 3B:
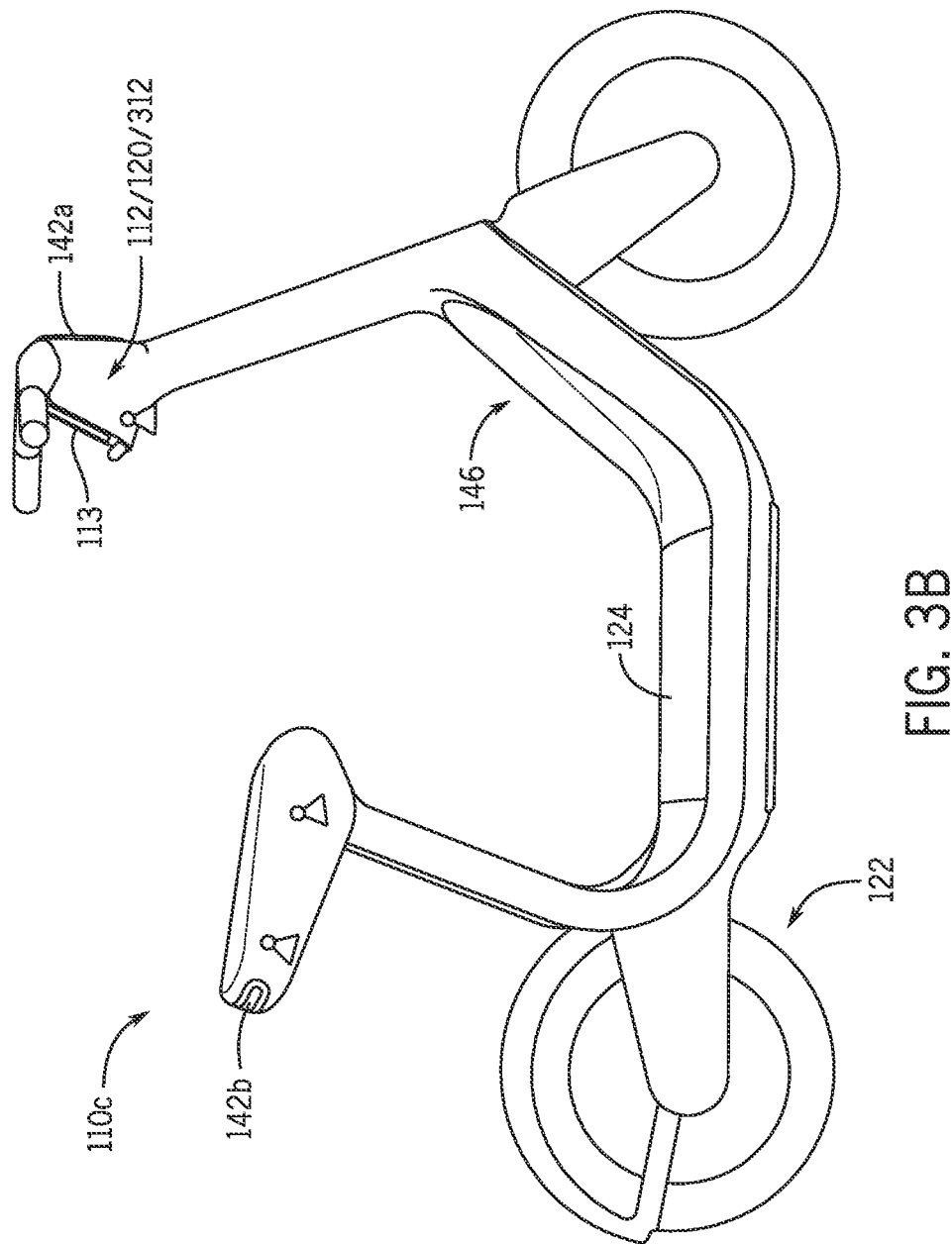
Figure 3C:
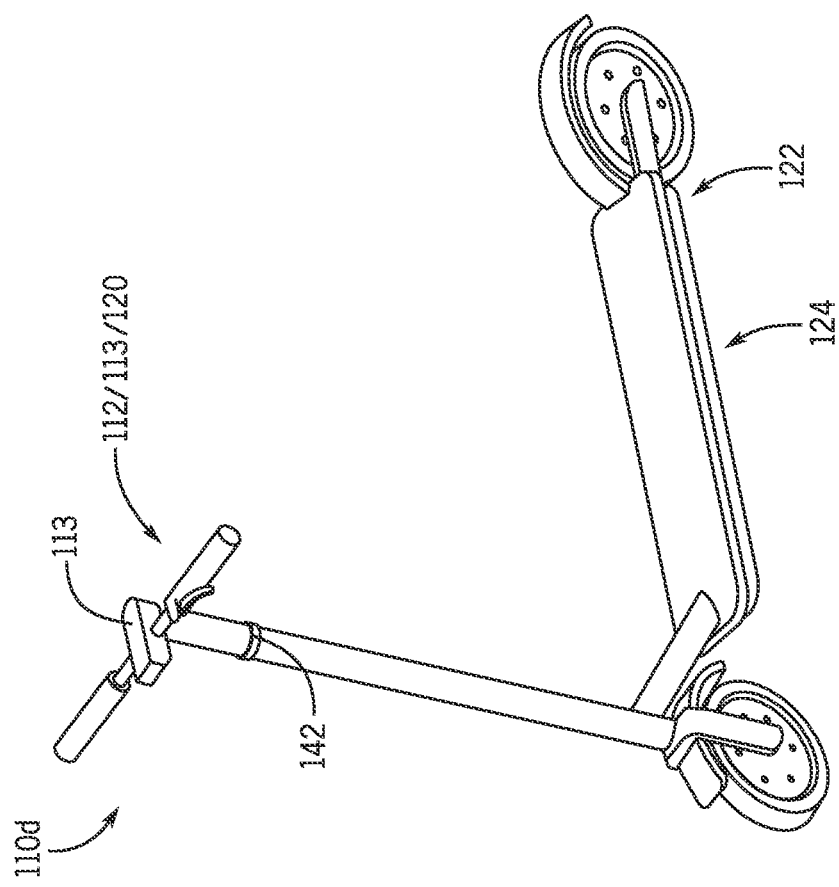

FIGS. 3A, 3B, and 3C illustrate respective diagrams of micromobility transit vehicles 110b, 110c, and 110d, which may be integrated network systems in accordance with an embodiment of the disclosure. For example, transit vehicle 110b of FIG. 3A may correspond to a motorized bicycle integrated with the various elements of system 100 and may be configured to participate in dynamic transportation matching system 200 of FIG. 2. As shown, transit vehicle 110b includes controller/user interface/wireless communications module 112/113/120 (e.g., integrated with a rear fender of transit vehicle 110b), propulsion system 122 configured to provide motive power to at least one of the wheels (e.g., a rear wheel 322) of transit vehicle 110b, battery 124 for powering propulsion system 122 and/or other elements of transit vehicle 110b, docking mechanism 140 (e.g., a spade lock assembly) for docking transit vehicle 110b at a docking station, user storage 146 implemented as a handlebar basket, and vehicle security device (e.g., an embodiment of vehicle security device 144 of FIG. 1), which may incorporate one or more of a locking cable 144a, a pin 144b coupled to a free end of locking cable 144a, a pin latch/insertion point 144c, a frame mount 144d, and a cable/pin holster 144e, as shown (collectively, vehicle security device 144). In some embodiments, controller/user interface/wireless communications module 112/113/120 may alternatively be integrated on and/or within a handlebar enclosure 313, as shown.

In some embodiments, vehicle security device 144 may be implemented as a wheel lock configured to immobilize rear wheel 322 of transit vehicle 110b, such as by engaging pin 144b with spokes of rear wheel 322. In the embodiment shown in FIG. 3A, vehicle security device 144 may be implemented as a cable lock configured to engage with a pin latch on a docking station, for example, or to wrap around and/or through a secure pole, fence, or bicycle rack and engage with pin latch 144c. In various embodiments, vehicle security device 144 may be configured to immobilize transit vehicle 110b by default, thereby requiring a transportation requester or rider to transmit a request to management system 240 (e.g., via user device 130) to reserve transit vehicle 110b before attempting to use transit vehicle 110b. The request may identify transit vehicle 110b based on an identifier (e.g., a QR code, a barcode, a serial number, etc.) presented on transit vehicle 110b (e.g., such as by user interface 113 on a rear fender of transit vehicle 110b). Once the request is approved, management system 240 may transmit an unlock signal to transit vehicle 110b (e.g., via network 250). Upon receiving the unlock signal, transit vehicle 110b (e.g., controller 112 of transit vehicle 110b) may release vehicle security device 144 and unlock rear wheel 322 of transit vehicle 110b.

Transit vehicle 110c of FIG. 3B may correspond to a motorized sit-scooter integrated with the various elements of system 100 and may be configured to participate in dynamic transportation matching system 200 of FIG. 2. As shown in FIG. 3B, transit vehicle 110c includes many of the same elements as those discussed with respect to transit vehicle 110b of FIG. 3A. For example, transit vehicle 110c may include user interface 113, propulsion system 122, battery 124, controller/wireless communications module/cockpit enclosure 112/120/312, user storage 146 (e.g., implemented as a storage recess), and operator safety measures 142a and 142b, which may be implemented as various types of head lights, programmable light strips, and/or reflective strips.

Transit vehicle 110d of FIG. 3C may correspond to a motorized stand or kick scooter integrated with the various elements of system 100 and may be configured to participate in dynamic transportation matching system 200 of FIG. 2. As shown in FIG. 3C, transit vehicle 110d includes many of the same elements as those discussed with respect to transit vehicle 110b of FIG. 3A. For example, transit vehicle 110d may include user interface 113, propulsion system 122, battery 124, controller/wireless communications module/cockpit enclosure 112/120/312, and operator safety measures 140, which may be implemented as various types programmable light strips and/or reflective strips, as shown.

Figure 3D:
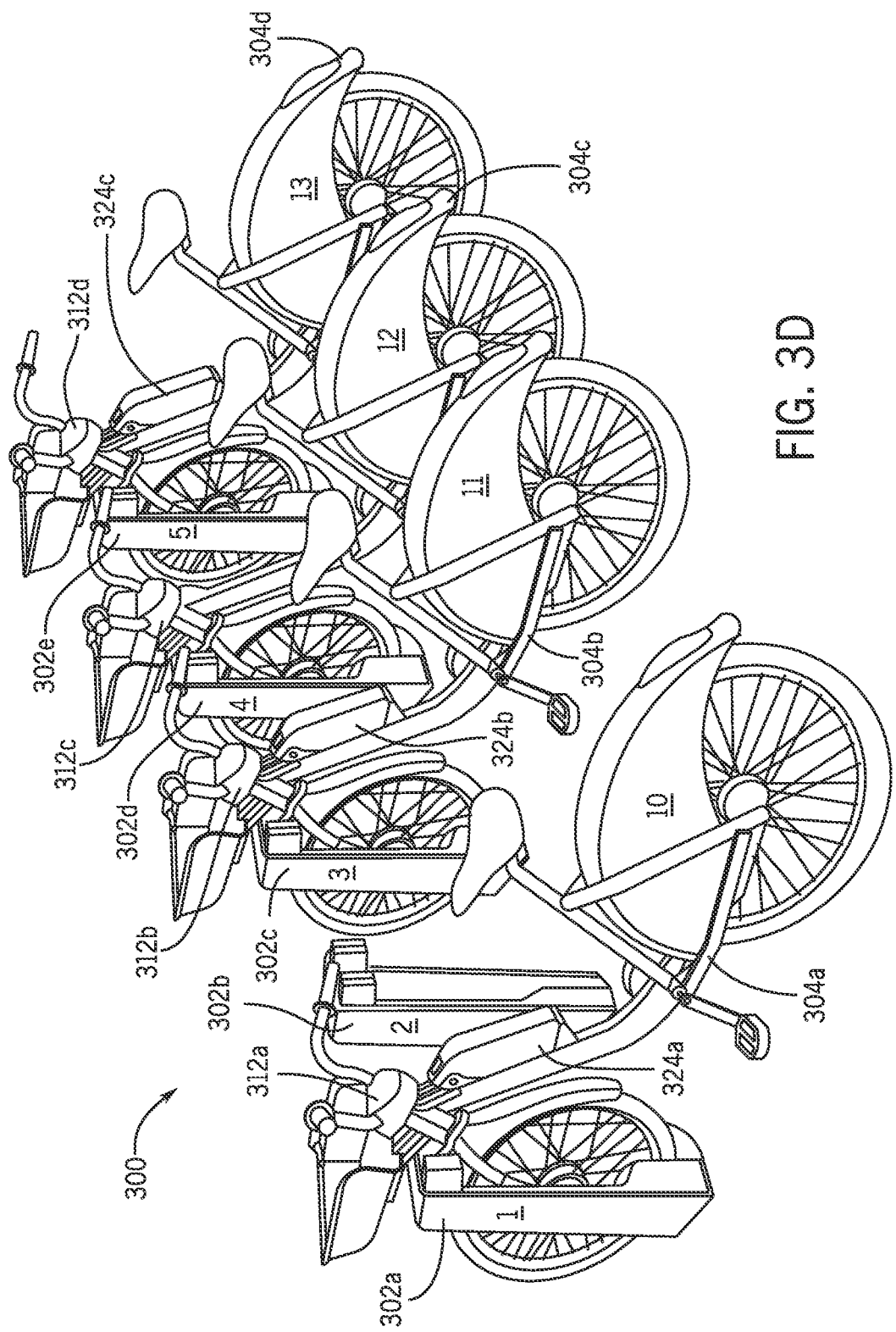
FIG. 3D illustrates a diagram of a docking station for docking one or more micromobility transit vehicles in accordance with an embodiment of the disclosure.

FIG. 3D illustrates a docking station 300 for docking transit vehicles (e.g., transit vehicles 110c, 110e, and 110g, etc.) according to one embodiment. As shown, docking station 300 may include multiple bicycle docks, such as docks 302a-e. In this example, a single transit vehicle (e.g., any one of electric bicycles 304a-d) may dock in each of the docks 302a-e of the docking station 300. Each of the docks 302a-e may include a lock mechanism for receiving and locking docking mechanism 140 of the electric bicycles 304a-d. In some embodiments, once a transit vehicle is docked in a bicycle dock, the dock may be electronically coupled to the transit vehicle (e.g., controllers 312a-d of the transit vehicle) via a link such that the transit vehicle and the dock may communicate with each other via the link.

A transportation requester or rider may use a user device (e.g., user device 130) to use a micromobility transit vehicle 110b-d that is docked in one of the bicycle docks 302a-e by transmitting a request to management system 240. Once the request is processed, management system 240 may transmit an unlock signal to a micromobility transit vehicle 110b-d docked in the dock and/or the dock via network 250. The docking station 300 may automatically unlock the lock mechanism to release the micromobility transit vehicle 110b-d based on the unlock signal. In some embodiments, each of the docks 302a-e may also be configured to charge batteries (e.g., batteries 324a-c) of the electric bicycle 304a-d, respectively, when the electric bicycle 304a-d are docked at the docks 302a-e. In some embodiments, docking station 300 may also be configured to transmit information associated with the docking station 300 (e.g., a number of transit vehicles docked at the docking station 300, charge statuses of the docked transit vehicles, etc.) to the management system 240.

FIG. 4 illustrates a diagram of a user interface 400 associated with a micromobility transit vehicle 402 in accordance with an embodiment of the disclosure. The micromobility transit vehicle 402 may be similar to any one of transit vehicles 110b, 110c, or 110d, described above. The user interface 400 may be integrated with the micromobility transit vehicle 402, such as integrated with at least a portion of a cockpit of the micromobility transit vehicle 402. In some embodiments, the user interface 400 may form at least a portion of an outer housing of the handlebar of the micromobility transit vehicle 402. The user interface 400 may be visible to the rider during operation. For instance, the user interface 400 may generally face rearwardly. The user interface 400 may include a display 410 configured to render information or other data. The display 410 may include many configurations, such as being an electronic ink display, although other configurations are contemplated. In other embodiments, the display 410 may be part of a mobile user computing device, such as a smart phone. As such, content, information, and data discussed herein as being presented on the display 410 can also or alternatively be displayed on the user computing device.

The user interface 400 may be similar to the user interface 113 or 132 described above. For example, route guidance information, usage cost, battery charge status, vehicle range, or other information related to the micromobility transit vehicle 402 may be rendered on the display 410. Information related to the operation of the micromobility transit vehicle 402, such as time information, map information, navigation information, instructions for operation, operational warnings or notifications, among others, may be rendered on the display 410. For example, one or more notifications may be rendered on the display 410 instructing or reminding the rider to properly lock and/or park the micromobility transit vehicle 402. In some embodiments, the user interface 400 may present information similar to that described in U.S.

patent application Ser. No. 16/578,995, entitled "MICRO-MOBILITY ELECTRIC VEHICLE WITH ELECTRONIC DEVICE HOLDER AND INTEGRATED DISPLAY," which is incorporated herein in its entirety for all purposes.

Figure 5A:
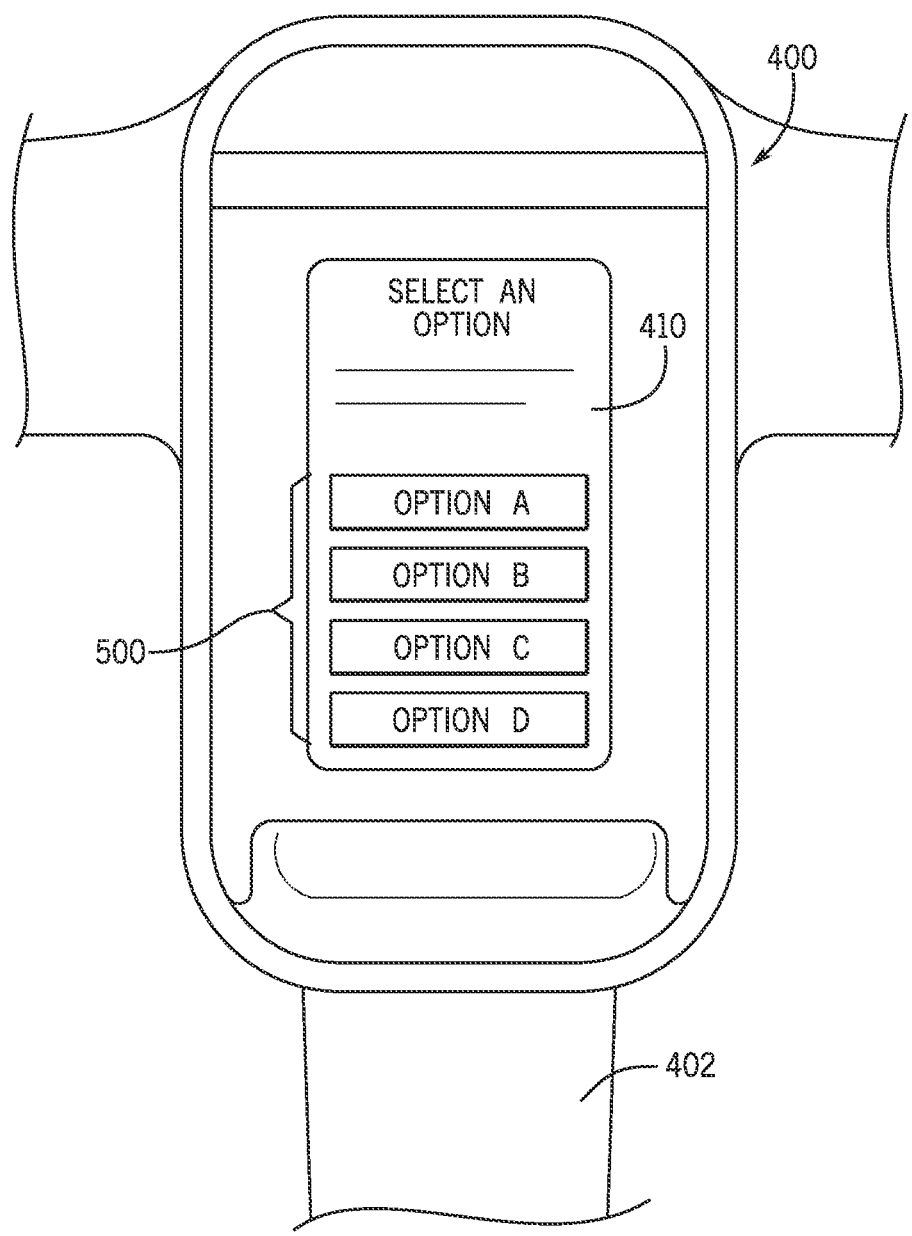
FIGS. 5A, 5B, and 5C illustrate respective diagrams of various examples of information rendered on a display of the user interface of FIG. 4 in accordance with an embodiment of the disclosure.
Figure 5B:
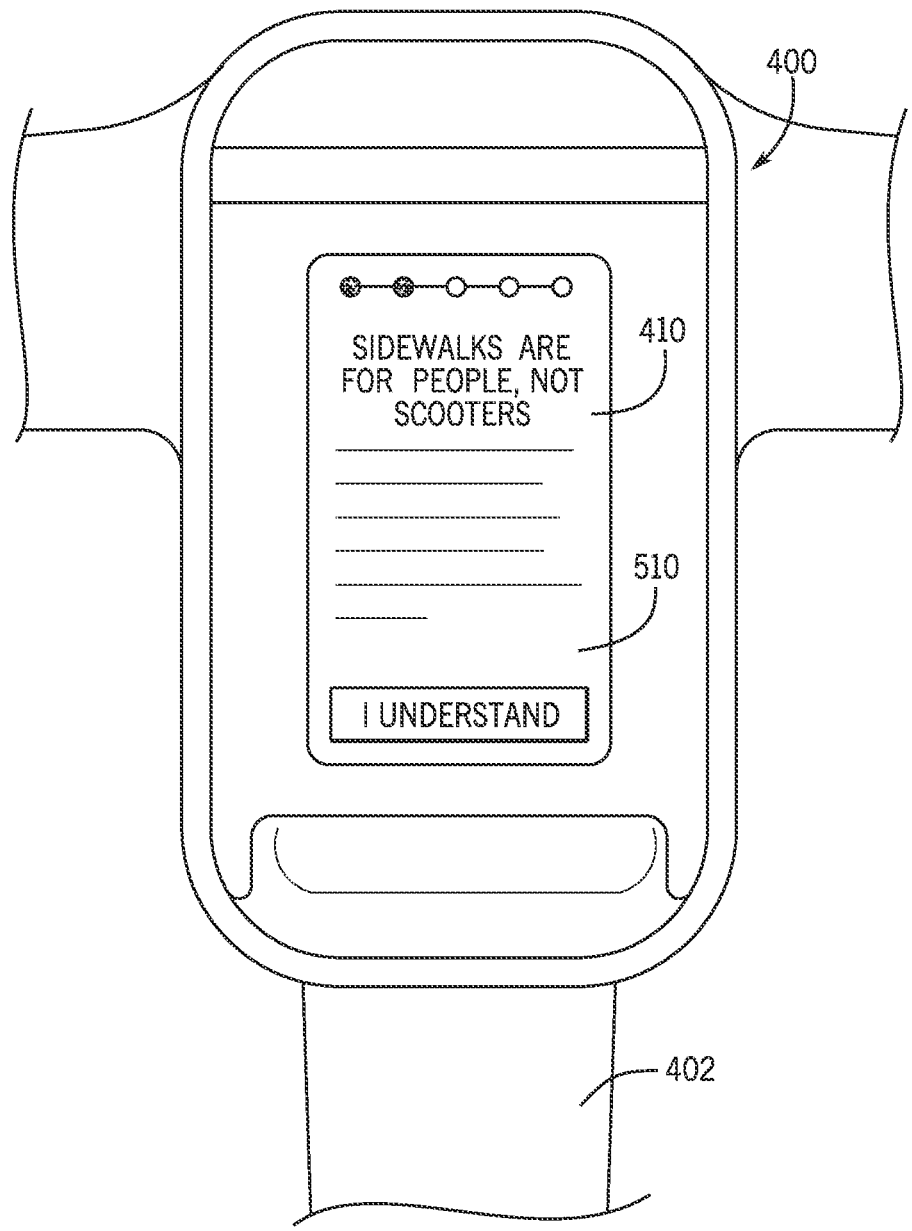
Figure 5C:
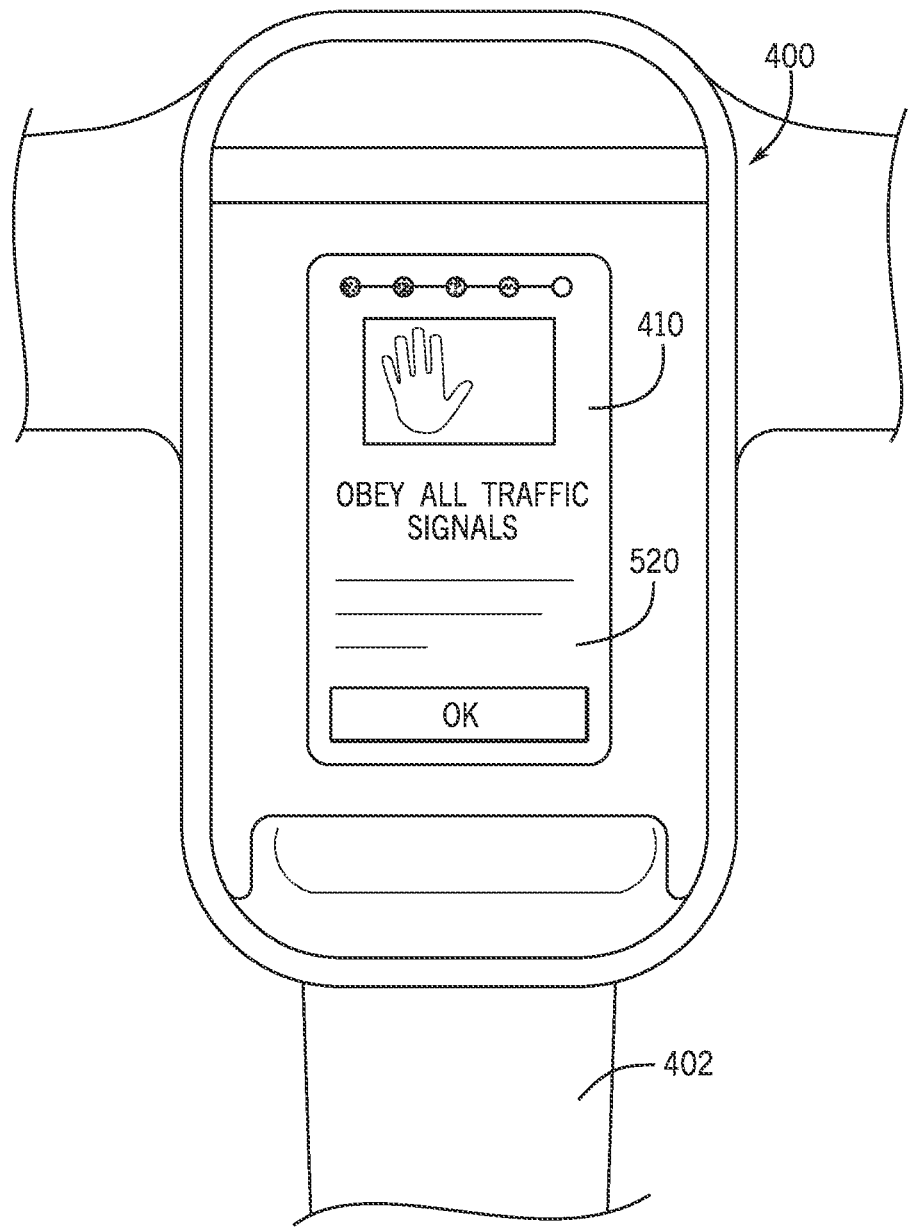

FIGS. 5A, 5B, and 5C illustrate respective diagrams of various examples of information rendered on the display 410 of the user interface 400 in accordance with an embodiment of the disclosure. The display 410 may render various information and different times, such as during operation of the micromobility transit vehicle 402, which includes starting, during, or ending a trip or prior to starting use or after ending a ride of the micromobility transit vehicle 402. For example, as shown in FIG. 5A, the display 410 may render one or more prompts, buttons, or selectable commands (hereinafter "options" 500 for sake of convenience, without intent to limit) for selection. The options 500 may prompt user selection to begin a ride, end a ride, pause a ride, or modify a ride, among others. In some embodiments, the options 500 rendered on the display 410 may allow user selection of one or more navigational commands, such as setting a starting location, setting a destination, starting navigational guidance, ending navigational guidance, modifying an existing navigation route, or the like. In some embodiments, the options 500 rendered on the display 410 may allow a transportation requester or rider to unlock the micromobility transit vehicle 402 from a docking station, pair the micromobility transit vehicle 402 to a docking station, request service or maintenance of the micromobility transit vehicle 402, report issues with the micromobility transit vehicle 402, and the like. In some embodiments, the options 500 rendered on the display 410 may allow the rider to turn on a head light assembly, turn off the head light assembly, or otherwise control operation of one or more systems of the micromobility transit vehicle 402.

Referring to FIG. 5B, the display 410 may render one or more notifications 510 related to operation of the micromobility transit vehicle 402. For instance, the display 410 may render use agreements, local rules and regulations, liability waivers, operation instructions, operation reminders, and the like for acknowledgment by the rider before, during, or after use. Referring to FIG. 5C, the display 410 may render one or more notifications 520 based on a detected condition of the micromobility transit vehicle 402. For example, the display 410 may render one or more notifications of a detected use violation (e.g., excessive speed detection, traffic signal violation, etc.), parking violation (e.g., on street, within a landscaped area, within a handicapped zone, etc.), lock violation (e.g., free locking, to an improper sign or structure, failure to lock, etc.), or any combination thereof. In other embodiments, the notifications need not be for a violation, but can be for conveying changes during operation of the micromobility transit vehicle 402, providing warnings of upcoming hazards or congestion along the ride or trip, providing reminders for use or operation, providing messages at the start and/or end of a ride, including positive messages if the user has complied with all use regulations or guidelines during the trip or user account updates, such as status, number of rides completed, or total distance traveled on the ride or over multiple rides, and offers or advertisements, such as when the micromobility transit vehicle 402 is detected as being stationary or stopped.

Figure 6:
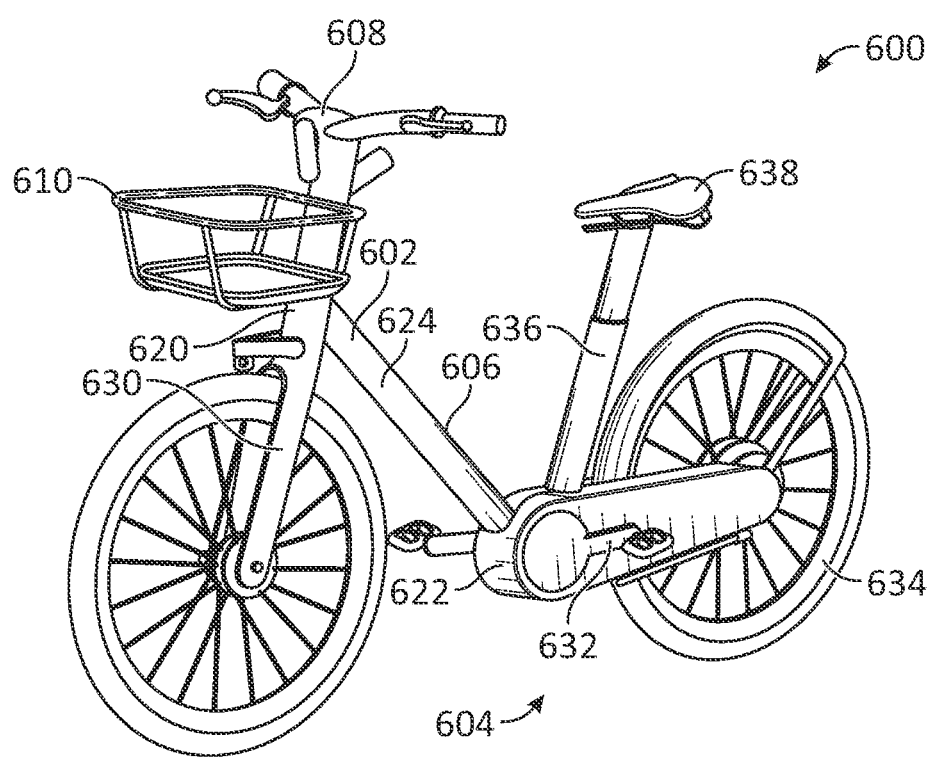
FIG. 6 illustrates a diagram of a micromobility transit vehicle in accordance with an embodiment of the disclosure.

FIG. 6 illustrates a diagram of a micromobility transit vehicle 600 in accordance with an embodiment of the disclosure. In the illustrated embodiment, the micromobility transit vehicle 600 is a bicycle, although other configurations are contemplated, including kick scooters, sit-scooters, and the like. As shown, the micromobility transit vehicle 600 includes a frame 602, a propulsion system 604, and a battery 606. In some embodiments, the micromobility transit vehicle 600 may include a cockpit assembly 608 and a storage basket 610. The micromobility transit vehicle 600 may be similar to any of the micromobility transit vehicles 110, 110b, 110c, or 110d, described above. Thus, any description above of like features is incorporated herein for micromobility transit vehicle 600.

The frame 602 may include many configurations. For example, the frame 602 may include any number of tubes, brackets, and other components. For instance, the frame 602 may include a headtube 620, a bottom bracket 622, a downtube 624 extending between the headtube 620 and the bottom bracket 622. The headtube 620 may rotatably support a front fork 630 of the micromobility transit vehicle 600, such as including a headset (with one or more bearings) allowing the front fork 630 to pivot freely. The bottom bracket 622 may rotatably support a portion of the propulsion system 604, such as a crankset 632 configured to drive a rear wheel 634 through reciprocating motion of a rider's legs. In some embodiments, the frame 602 may include other tubes, such as a seat tube 636 supporting a seat 638. In some embodiments, the frame 602 may include a top tube, though such is not required, as illustrated in FIG. 6. Thus, the frame 602 may include any number of frame members coupled together to form a support structure for the various components of the micromobility transit vehicle 600.

The propulsion system 604 may be any system or device operable to provide a motive force to at least one wheel of the micromobility transit vehicle 600 (e.g., the rear wheel 634) to propel the micromobility transit vehicle 600 across a surface (e.g., a road surface, a sidewalk, a path, a trail, etc.). The propulsion system 604 may be similar to the propulsion system 122 described above, such as including an electric motor coupled to the at least one wheel and a motor controller electronically coupled to the electric motor to control a motive force provided by the electric motor to the at least one wheel. Such embodiments are illustrative only, and the propulsion system 604 may include other features, such as a brake resistor electronically coupled to the motor controller to produce a braking torque or dynamic braking on the electric motor through electrical resistance, thereby decelerating the electric motor as desired. In some embodiments, at least some portions of the propulsion system 604 may be housed within the frame 602, such as the motor housed or concealed by the rear chain stays. As described herein, "electronically coupling" or "electronically coupled" means electrically coupled together (e.g., for power coupling), communicatively coupled together (e.g., for sensor data communication), or both electrically coupled and communicatively coupled together.

The battery 606 may be configured to provide electric power to the micromobility transit vehicle 600. For example, the battery 606 may be configured to provide electric power to the propulsion system 604 (e.g., to an electric motor) to propel the micromobility transit vehicle 600, for example, as well as to various other modules of the micromobility transit vehicle 600. The battery 606 may be implemented with one or more battery cells, controllers, and/or safety measures. For example, the battery 606 may include thermal interlocks and one or more logic devices, sensors, and/or a display to monitor and provide visual feedback of a charge status of the battery 606 (e.g., a charge percentage, a low charge indicator, etc.).

Other modules powered by the battery 606 may include other and/or additional sensors, actuators, communications modules, and/or user interface devices, for example. In some embodiments, the other modules may include one or more proximity sensors, cameras, lights (e.g., a headlight, indicator lights, etc.), alarms, environmental sensors, dynamic sensors, propulsion control systems, and the like. In some embodiments, the battery 606 may include an architecture similar to that described in U.S. patent application Ser. No. 16/728,600, entitled "VEHICLE BATTERY INTEGRATION SYSTEMS AND METHODS," or in U.S. patent application Ser. No. 16/836,259, entitled "VEHICLE BATTERY SECURING SYSTEMS AND METHODS," which are incorporated herein by reference in their entireties.

The cockpit assembly 608 may provide a functional, intuitive, and distinctive cockpit or user interface for the rider when riding the micromobility transit vehicle 600. For example, the cockpit assembly 608 may be implemented with several interfaces, components, or features allowing the rider to see, verify, or control one or more operations of the micromobility transit vehicle 600. The cockpit assembly 608 may form at least part of an outer housing for the micromobility transit vehicle's handlebars. In some embodiments, the cockpit assembly 608 may include user interface 400 described above. In some embodiments, the cockpit assembly 608 may be similar to the cockpit assembly disclosed in U.S. patent application Ser. No. 16/729,070, entitled "MICRO-MOBILITY FLEET VEHICLE COCKPIT ASSEMBLY SYSTEMS AND METHODS," which is incorporated herein in its entirety for all purposes.

The storage basket 610 may be coupled to the frame 602, such as to the headtube 620, and may provide one or more functional benefits. For instance, the storage basket 610 may be configured to store a rider's belongings during a ride. In some examples, the storage basket 610 may be configured to provide a locking function. For example, the micromobility transit vehicle 600 may be locked or otherwise secured to a docking station or other stationary object via one or more components of the storage basket 610, such as a lock cable of the storage basket 610. In some embodiments, the storage basket 610 may be similar to the storage basket disclosed in U.S. patent application Ser. No. 15/930,195, entitled "MICROMOBILITY TRANSIT VEHICLE LOCK-TO MECHANISM SYSTEMS AND METHODS," which is incorporated herein in its entirety for all purposes.

Figure 7A:
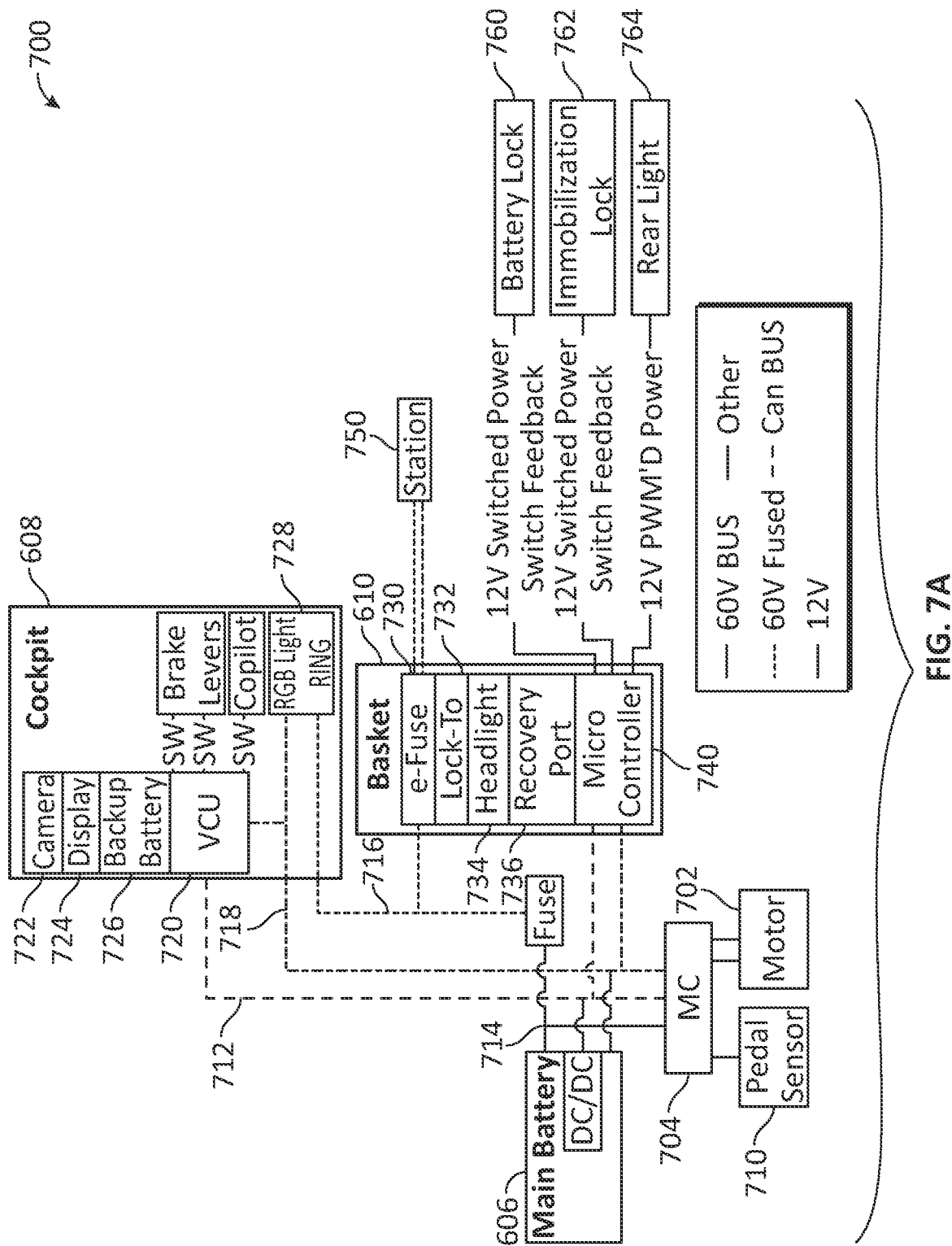
FIG. 7A illustrates a block diagram of an electrical architecture of the micromobility transit vehicle of FIG. 6 in accordance with an embodiment of the disclosure.
Figure 7B:
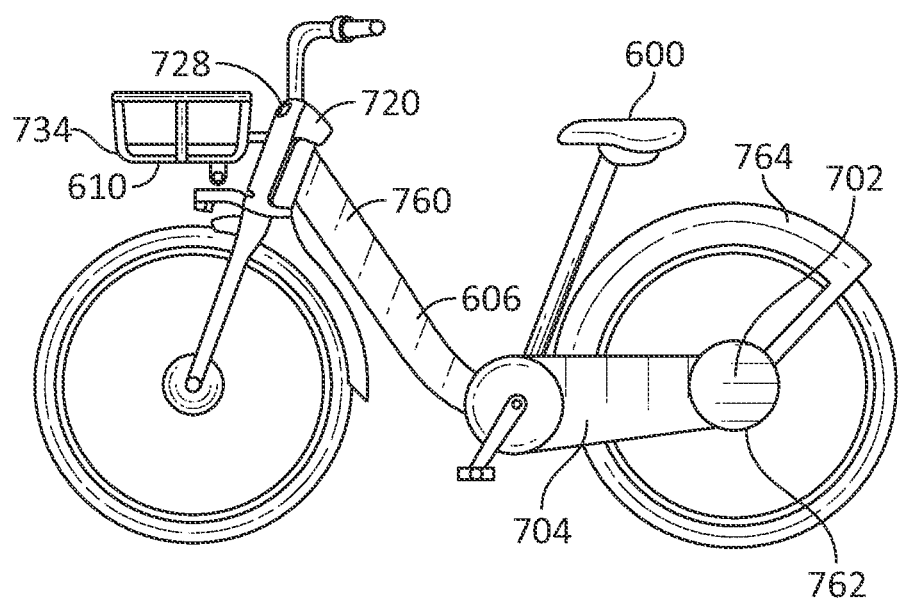
FIG. 7B illustrates a block diagram of the micromobility transit vehicle and showing the components of the electrical architecture on the micromobility transit vehicle in accordance with and embodiment of the disclosure.

FIG. 7A illustrates a block diagram of an electrical architecture 700 of the micromobility transit vehicle 600 in accordance with an embodiment of the disclosure. FIG. 7B illustrates a block diagram of the micromobility transit vehicle 600 and showing the components of the electrical architecture 700 on the micromobility transit vehicle 600 in accordance with an embodiment of the disclosure. Although the electrical architecture 700 is described with reference to micromobility transit vehicle 600, the electrical architecture 700 may be associated with any of transit vehicles 110, 110b, 110c, or 110d, described above.

As shown, the electrical architecture 700 includes the battery 606, an electric motor 702, a motor controller 704, storage basket 610, and cockpit assembly 608. In some embodiments, the electrical architecture 700 includes one or more sensor units, such as a pedal sensor 710, a cadence sensor, and a torque sensor, among others. The battery 606, electric motor 702, motor controller 704, storage basket 610, and cockpit assembly 608 may be electronically coupled in many configurations. For example, the battery 606, motor controller 704, storage basket 610, and cockpit assembly 608 may be electronically coupled via one or more signal and/or power connections, such as one or more 12V power supply connections 712, one or more 60V bus connections 714, one or more 60V fused connections 716, or one or more controller area network (CAN) bus connections 718.

The cockpit assembly 608 may include a vehicle control module (VCU) 720, a camera 722, and a display 724. In some embodiments, the cockpit assembly 608 may include a backup battery 726 and a light ring 728. In some embodiments, the cockpit assembly 608 may include one or more other modules, such as a cellular module, an audio module, an NFC module, a brake lever module, a copilot module, and a navigation module, or any combination thereof.

The storage basket 610 may include a charging circuit 730, a lock-to mechanism 732, a head light 734, a recovery port 736, and a microcontroller 740, or any combination thereof. In this manner, the storage basket 610 may be referred to as a smart basket. The charging circuit 730 may be electronically coupled to a charging device, such as a docking station 750, to charge the battery 606 of the micromobility transit vehicle 600. The recovery port 736 may be a data connection, such as a USB connection, to one or more electrical components of the storage basket 610. The microcontroller 740 may be electronically coupled to one or more components or devices of the micromobility transit vehicle 600. For example, the microcontroller 740 may be electronically coupled to a battery lock 760, an immobilization lock 762, and a tail light 764 of the micromobility transit vehicle 600. The connection between the microcontroller 740 and each of the battery lock 760 and immobilization lock 762 may be a 12V switched power feedback connection. The connection between the microcontroller and the tail light may be a 12V pulse width modulation connection. In such embodiments, the microcontroller 740 may control operation of the battery lock 760, the immobilization lock 762, and the tail light 764. The battery lock 760 may selectively lock the battery 606, such as to prevent battery theft, as explained below. The immobilization lock 762 may selectively lock the rear wheel 634, such as to prevent movement and/or theft of the micromobility transit vehicle 600.

Figure 8:
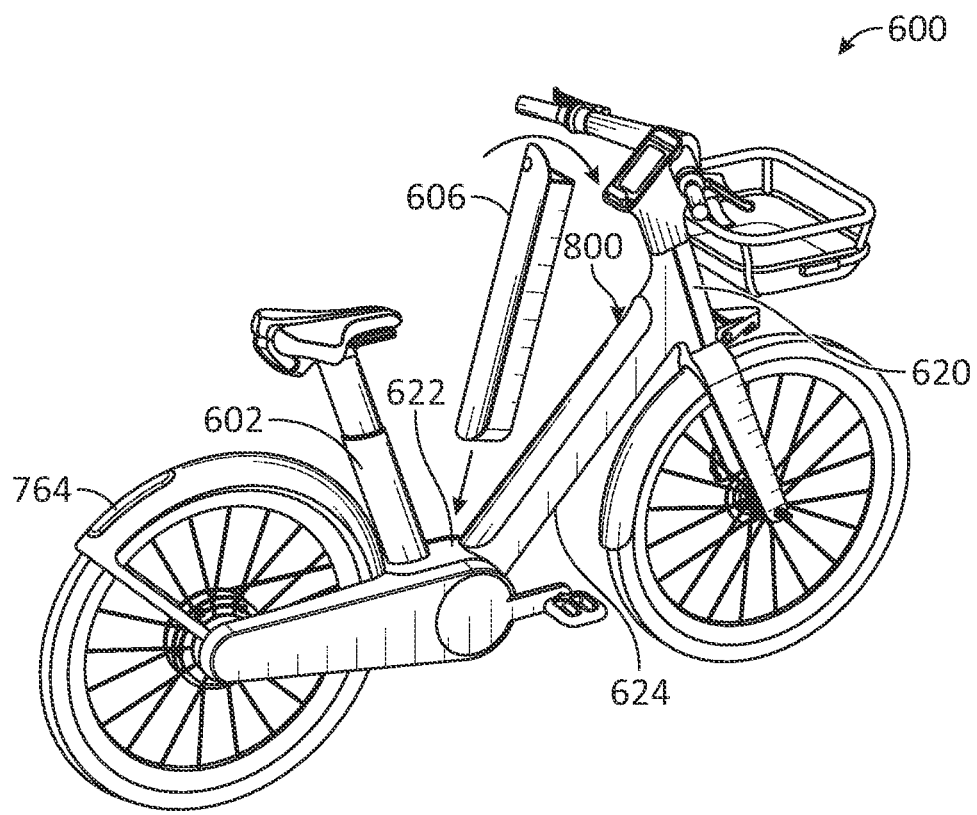
FIG. 8 illustrates a partially exploded view of the micromobility transit vehicle of FIG. 6 in accordance with an embodiment of the disclosure.

FIG. 8 illustrates a partially exploded view of the micromobility transit vehicle 600 in accordance with an embodiment of the disclosure. Referring to FIG. 8, the downtube 624 may have a recess 800 disposed therein. As shown, the recess 800 may be created in, formed in, defined in, or otherwise provided by the downtube 624 along a length of the downtube 624 between the headtube 620 and the bottom bracket 622. Depending on the application, the recess 800 may extend along a majority of the length of the downtube 624, along the entire length of the downtube 624, or along any suitable portion (length or location) of the downtube 624. In some embodiments, the recess 800 may extend from adjacent to the headtube 620 to adjacent to the bottom bracket 622. As shown, the recess 800 may extend along an upper portion of the downtube 624, such as along the top of the downtube 624. In some embodiments, the recess 800 may extend along other portions of the downtube 624, such as along a left side of the downtube 624, along a right side of the downtube 624, or along an underside of the downtube 624. Although the recess 800 is shown and described as disposed in the downtube 624, the recess 800 may be disposed in a different tube of the frame 602, such as in the seat tube 636, in the top tube, in a combination of two or more tubes, or the like. Thus, reference to the recess 800 disposed in the downtube 624 of the frame 602 is by way of example only.

With continued reference to FIG. 8, the battery 606 may be receivable within the downtube 624 and the recess 800 of the downtube 624. As a result, the battery 606 may be integrated into or placed within the frame 602, rather than exposed. For example, at least a portion of the battery 606 may be positioned within the recess 800 of the downtube 624 to secure the battery 606 to the frame 602. In such embodiments, the recess 800 may be shaped to receive the battery 606 or at least a portion of the battery 606 therein. As explained more fully below, such configurations may provide a secure attachment of the battery 606 to the frame 602. Such configurations may also provide an attachment that is less prone to vandalism and/or damage or at least limits vandalism and/or damage to the battery 606. For example, receipt of the battery 606 at least partially within the recess 800 may shield vulnerable portions of the battery 606 positioned within the frame 602, as detailed below.

Figure 9:
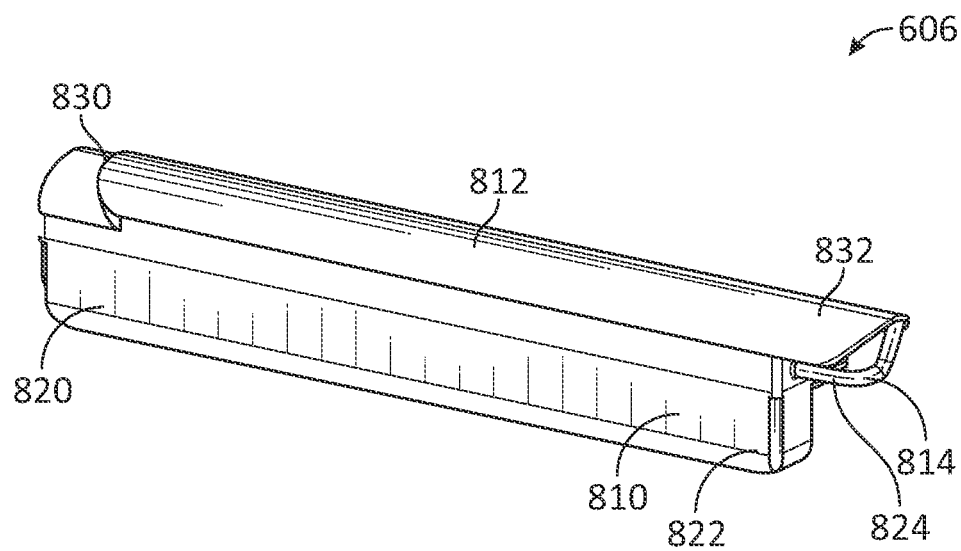
FIG. 9 illustrates a top view of a battery for a micromobility transit vehicle in accordance with an embodiment of the disclosure.
Figure 10:
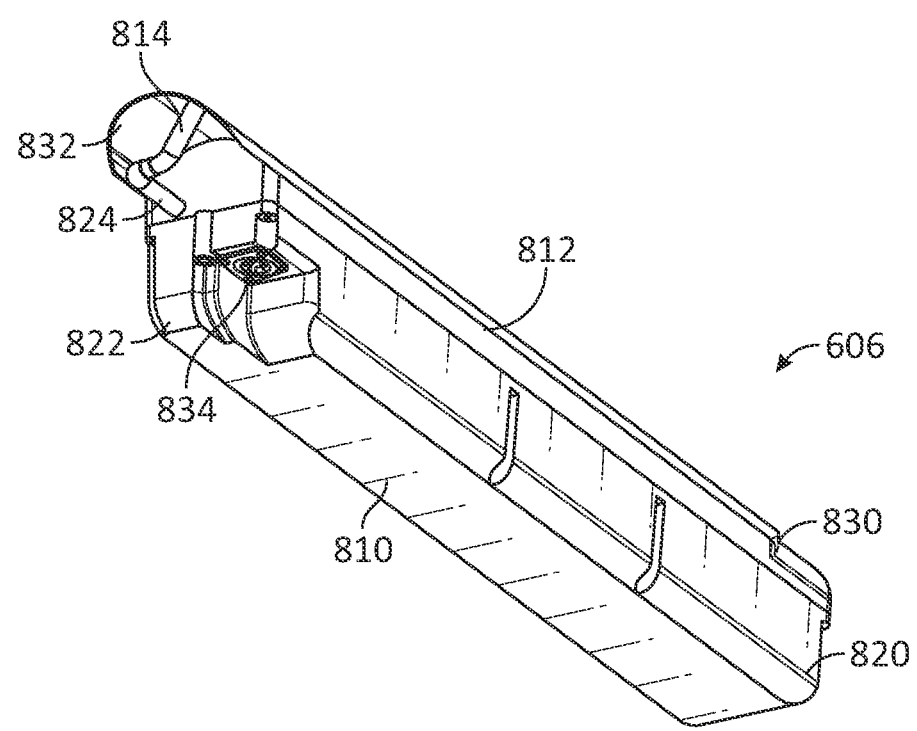
FIG. 10 illustrates a bottom view of the battery of FIG. 9 in accordance with an embodiment of the disclosure.

FIG. 9 illustrates a top view of the battery 606 in accordance with an embodiment of the disclosure. FIG. 10 illustrates a bottom view of the battery 606 in accordance with an embodiment of the disclosure. Referring to FIGS. 9 and 10, the battery 606 may include many configurations. For example, the battery 606 may include an enclosure 810, an outer wall 812 connected to the enclosure 810, and a handle 814 extending from the outer wall 812, such as between the enclosure 810 and the outer wall 812. The enclosure 810 may house one or more battery cells. The enclosure 810 may be rated against dust and water intrusion. For example, the enclosure 810 may be sealed and have an IP67 ingress rating under the Ingress Protection Code. In some embodiments, the enclosure 810 may include one or more structural features. For instance, the enclosure 810 may include an aluminum pack (for stiffness), leadscrew style locking, and/or a shape providing increased torsional stiffness, among other features.

The enclosure 810 may include a first end 820 and an opposing second end 822. As described below, the first end 820 may be receivable within the downtube 624 of the frame 602, and the second end 822 may be receivable within the recess 800. For instance, the first end 820 of the enclosure 810 may be seated within the downtube 624 and the second end 822 of the enclosure 810 may be rotated into the recess 800 of the downtube 624 to connect the battery 606 to the frame 602 of the micromobility transit vehicle 600.

The outer wall 812 may extend from the enclosure 810 or may be defined as part of the enclosure 810. For instance, the outer wall 812 may be formed integrally with at least a portion of the enclosure 810, such as the enclosure 810 and the outer wall 812 formed together through injection molding, blow molding, machining, or the like. The outer wall 812 may have an arcuate shape to complement the recess 800 disposed in the downtube 624 of the frame 602. For instance, the outer wall 812 may be shaped to match or generally match the shape of the recess 800 within the downtube 624, such that the outer wall 812 fits within and generally fills the opening of the recess 800. In some embodiments, the outer wall 812 may include one or more strengthening features. For example, a metal plate may be embedded in the outer wall 812 to increase the strength and/or rigidity of the outer wall 812 or battery 606 and/or improve theft resistance. In some embodiments, the outer wall 812 (or at least portions of the outer wall 812) may be metal for increased strength or durability of the outer wall 812 or battery 606 and/or improve resistance to vandalism (e.g., from theft, arson, etc.).

In some embodiments, the outer wall 812 may be offset from the enclosure 810. For instance, the outer wall 812 may be offset inwardly at the first end 820, such as the outer wall 812 offset from the first end 820 of the enclosure 810 towards the second end 822 to define a reduced thickness at the first end 820 compared to the second end 822. For example, the upper portion of the battery 606 at the first end 820 may have a stepped shape, such as the battery 606 including a step 830 from the first end 820 of the enclosure 810 to the outer wall 812. The outer wall 812 may also be offset from the second end 822 of the enclosure 810. As shown, the outer wall 812 may be offset outwardly at the second end 822, such as the outer wall 812 extending beyond and away from the second end 822. In some embodiments, the outer wall 812 (or at least a portion thereof) may be cantilevered from the second end 822 of the housing. As a result, the outer wall 812 at the second end 822 may define an overhang structure or shroud 832.

The offset nature of the outer wall 812 relative to the enclosure 810 may allow the battery 606 to be connected to the frame 602 of the micromobility transit vehicle 600. For instance, the reduced thickness of the battery 606 at the first end 820 may allow the first end 820 of the battery 606 to be seated within the downtube 624 of the frame 602. For example, at least a portion of the battery 606 may sink into the downtube 624 to connect the battery 606 to the frame 602. In some embodiments, the shape of the battery 606 (e.g., the first end 820) may allow the first end 820 to sink into the downtube 624. The first end 820 may sink into the downtube 624 until the step 830 of the battery 606 engages the downtube 624, such as the step 830 engaging a portion of the downtube 624 defining the recess 800. Sinking the battery 606 at least partially into the downtube 624 may discourage vandalism and/or theft. For instance, sinking the battery 606 at least partially into the downtube 624 may reduce or remove pry points and thus the ability to get under the battery 606 to pry the battery 606 out of engagement with the downtube 624. The offset nature of the outer wall 812 at the second end 822 may accommodate locking of the battery 606 to the frame 602, as detailed below. For instance, the shroud 832 may conceal a latching area between the battery 606 and the downtube 624. The shroud 832 may reduce or remove pry points at the latching area, limiting the ability to pry the battery 606 at the latching area.

The handle 814 may extend from the second end 822 of the enclosure 810 to the shroud 832 defined by the outer wall 812. Depending on the application, the handle 814 may be embedded or in-molded to the enclosure 810 and/or outer wall 812 of the battery 606 or may be fastened to the enclosure 810 and/or outer wall 812. The handle 814 may provide one or more functional characteristics. For example, the battery 606 may be manipulated via the handle 814, such as the battery 606 carried by the handle 814, placed into position within the frame 602 of the micromobility transit vehicle 600 by the handle 814, or removed from the frame 602 by the handle 814, among others. In some embodiments, the handle 814 may function to secure the battery 606 to the downtube 624 of the micromobility transit vehicle 600. For example, the handle 814 may include, define, or otherwise function as a striker 824 for a battery lock configured to secure the battery 606 in place, as explained more fully below.

Referring to FIG. 10, the battery 606 may include other features. For example, the battery 606 may include an electrical connector 834. The electrical connector 834 may be configured to electrically connect the battery 606 to a charger and/or the electrical system of the micromobility transit vehicle 600. For example, positioning the battery 606 within the downtube 624 and recess 800 may electrically connect the electrical connector 834 with the electrical system of the micromobility transit vehicle 600. As shown, the electrical connector 834 may be positioned at the second end 822 of the enclosure 810, such as adjacent to the handle 814, although other configurations are contemplated.

Figure 11:
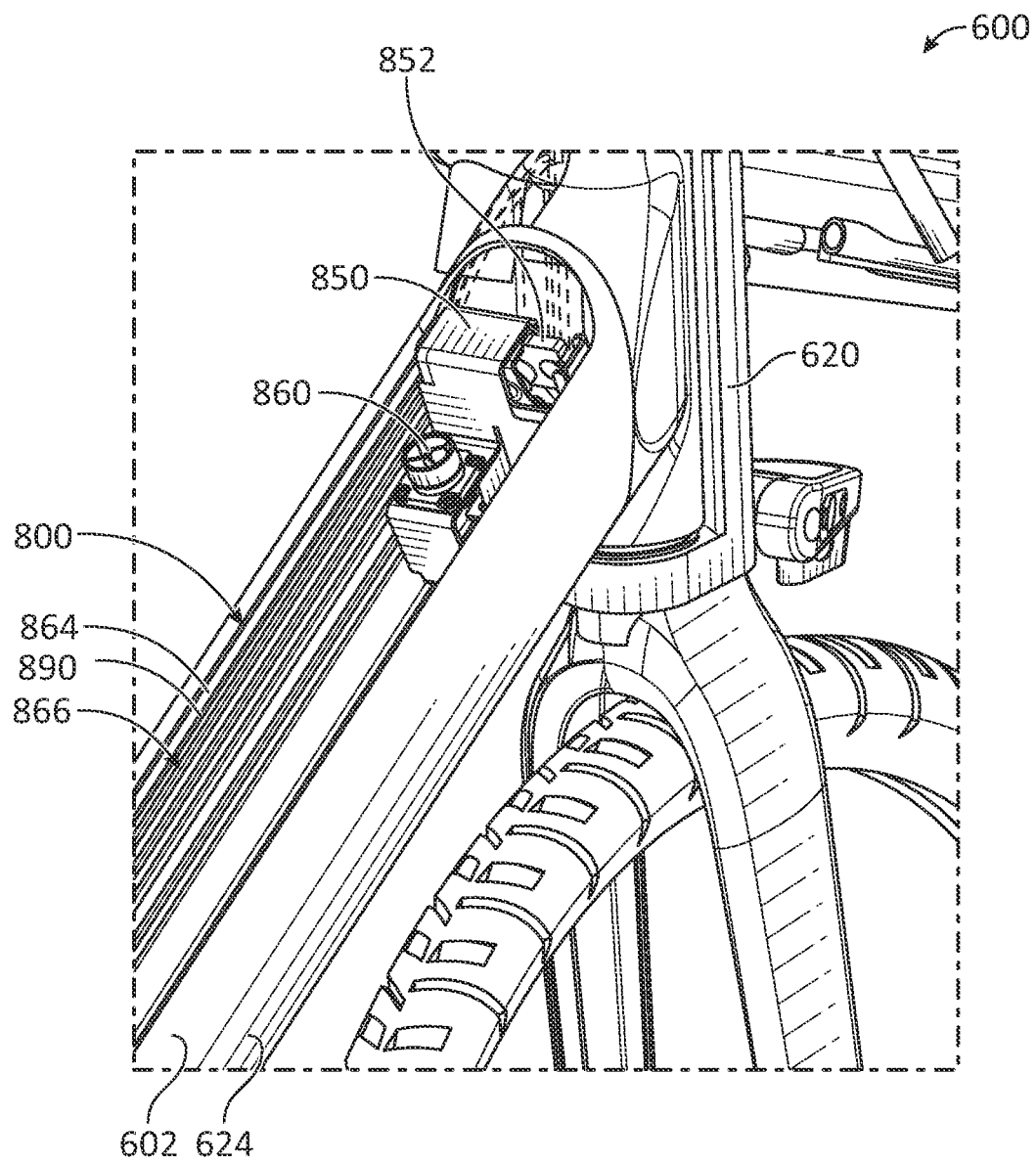
FIG. 11 illustrates a diagram of a battery lock within a recess disposed in a downtube of a micromobility transit vehicle in accordance with an embodiment of the disclosure.

FIG. 11 illustrates a diagram of a battery lock 850 in accordance with an embodiment of the disclosure. The battery lock 850 may be similar to the battery lock 760 discussed above. As shown in FIG. 11, the battery lock 850 may be located within the recess 800. In one embodiment, the battery lock 850 may be positioned within the recess 800 near or adjacent to the headtube 620 of the frame 602. As described herein, the battery lock 850 is configured to engage the battery 606 to lock the battery 606 in place. For example, the battery lock 850 may be configured to engage the handle 814 of the battery 606 (e.g., the striker 824) to lock the battery 606 in place.

The battery lock 850 may include many configurations. As shown in FIG. 11, the battery lock 850 may include a latch 852. The latch 852 may be configured to engage the handle 814/striker 824 of the battery 606 to lock the battery 606 to the battery lock 850. For example, the latch 852 may include a hook, tab, or other structure designed to selectively engage the handle 814/striker 824 of the battery 606. Once engaged with the battery 606, the latch 852 may lock the battery 606 in place and prevent removal of the battery 606 from the frame 602. For example, the battery lock 850 may automatically lock once engaged with the handle 814/striker 824 of the battery 606, or the battery lock 850 may receive one or more lock commands from management system 240 or a mobile user device (e.g., user device 130).

In one embodiment, the battery lock 850 may be an electromechanical lock. Specifically, the battery lock 850 may be operated by applying an electric current to the latch 852 or to a solenoid or other actuator controlling movement of the latch 852. For instance, applying electric current to the latch 852 (or associated actuator of the latch 852) may cause the latch 852 to lock or unlock. Depending on the application, the electromechanical lock may be fail secure or fail safe. In a fail secure configuration, application of electric current to the latch 852 (or associated actuator of the latch 852) will cause the electromechanical lock to unlock. In a fail-safe configuration, application of electric current to the latch 852 (or associated actuator of the latch 852) will cause the electromechanical lock to lock. In some embodiments, the electromechanical lock may be reversible between a fail secure configuration and a fail-safe configuration.

In another embodiment, the battery lock 850 may be an electromagnetic lock. In such an embodiment, the battery lock 850 may include an electromagnet positioned within the recess 800 of the downtube 624. When the electromagnet is energized or activated, current passing through the electromagnet creates a magnetic flux that causes the handle 814/striker 824 of the battery 606 to attract to the electromagnet, creating a locking action. To limit theft and discourage vandalism, the electromagnetic lock may be fail secure, with the battery lock 850 remaining locked when power is lost. In some embodiments, the electromagnetic lock may be fail safe, with the battery lock 850 unlocking when power is lost. Like the electromechanical lock, the electromagnetic lock may be reversible between a fail secure configuration and a fail-safe configuration.

To unlock the battery lock 850, the battery lock 850 may include one or more actuators or controllers. For example, the battery lock 850 may be smart controlled, such as controlled via one or more logic devices of the micromobility transit vehicle 600 and/or management system 240. In one embodiment, management system 240 may send one or more unlock commands to the battery lock 850 when it is desired to remove the battery 606 from the frame 602 (e.g., as requested by a rider or service technician through an app running on a mobile user device, such as user device 130). In some embodiments, the battery lock 850 may communicate directly with a mobile user device (e.g., user device 130) to receive one or more unlock commands, such as via an authentication module or other secure means. In some embodiments, the micromobility transit vehicle 600 may include an override control (e.g., an override button or actuator) to manually unlock the battery lock 850. The override control may be accessed from the headtube 620 or from an underside of the downtube 624, among other locations.

With continued reference to FIG. 11, the micromobility transit vehicle 600 may include a power connector 860 within the recess 800. The power connector 860 is engageable with the battery 606 when the battery 606 is received within the downtube 624 and the recess 800 to establish an electrical connection between the power connector 860 and the battery 606. For example, the power connector 860 may be positioned within the recess 800 to engage the electrical connector 834 of the battery 606 to electrically connect the battery 606 to the electrical system of the micromobility transit vehicle 600. In some embodiments, the power connector 860 may be adjacent to the battery lock 850. As shown, the power connector 860 may be adjacent to the headtube 620. Such configurations may limit or prevent one or more connection failures between the battery 606 and the power connector 860. For example, positioning the electrical connection between the battery 606 and the micromobility transit vehicle 600 near the headtube 620 may limit or prevent the electrical connection from getting wet or otherwise short circuiting due to moisture or other debris entering and building up within the recess 800 of the downtube 624. In some embodiments, the micromobility transit vehicle 600 may include one or weep holes or other drainage features allowing fluid to drain from within the recess 800.

As shown in FIG. 11, the downtube 624 may include one or more strengthening features accounting for the removal of material to define the recess 800. For example, the downtube 624 may have a profile shape within the recess 800 defined by alternating ribs 864 and grooves 866, although other configurations are contemplated, such as castings, forgings, extrusions, and/or hydroforming, among other configurations for shaping various ductile metals, such as aluminum, brass, low alloy steel, and stainless steel into lightweight, structurally stiff and strong pieces. Such and other configurations may increase the cross-sectional strength and/or structural stiffness/rigidity of the downtube 624 to account for any strength reduction due to the recess 800 being formed in the downtube 624. In some embodiments, the battery 606 (e.g., the enclosure 810) may be used as a structural member to increase the strength, stiffness, or rigidity of the downtube 624 when the battery 606 is positioned within the downtube 624. For example, the enclosure 810 may add torsional stiffness to the downtube 624 once one or more clearances between the enclosure 810 and the downtube 624 are taken up from deflection. In some embodiments, one or more cables 890 may be routed within the grooves 866. Depending on the application, the cables 890 may be electrical cables (e.g., power cables, communication cables, data cables, etc.) or control cables (e.g., brake cables, throttle cables, etc.), among others, or any combination thereof. For example, one or more brake cables may be routed within the grooves 866 from the brakes to the headtube 620.

Figure 12:
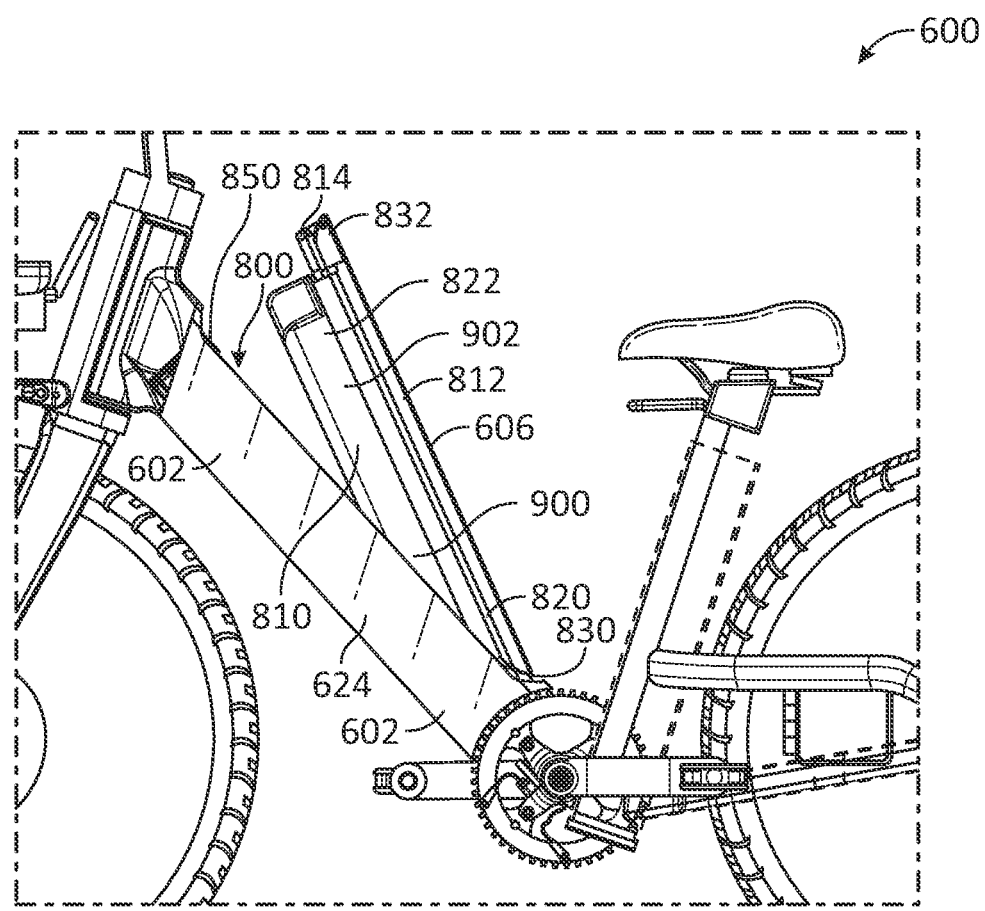
FIG. 12 illustrates a diagram of the battery initially positioned within the recess of the downtube in accordance with an embodiment of the disclosure.
Figure 13:
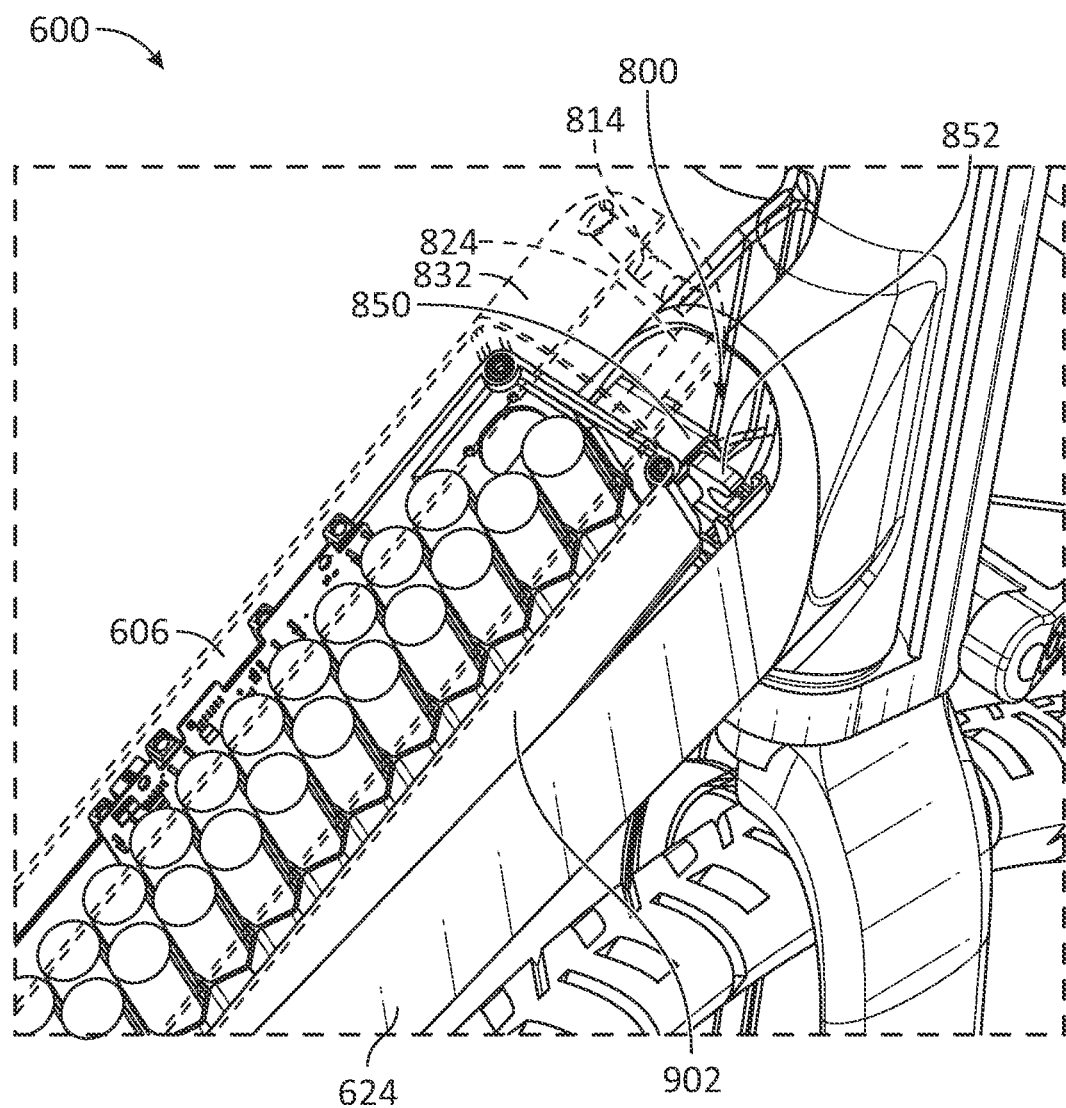
FIG. 13 illustrates a diagram of the battery further positioned within the recess of the downtube and positioned for engagement with the battery lock in accordance with an embodiment of the disclosure. An outer wall of the battery is illustrated as transparent for illustration purposes only.
Figure 14:
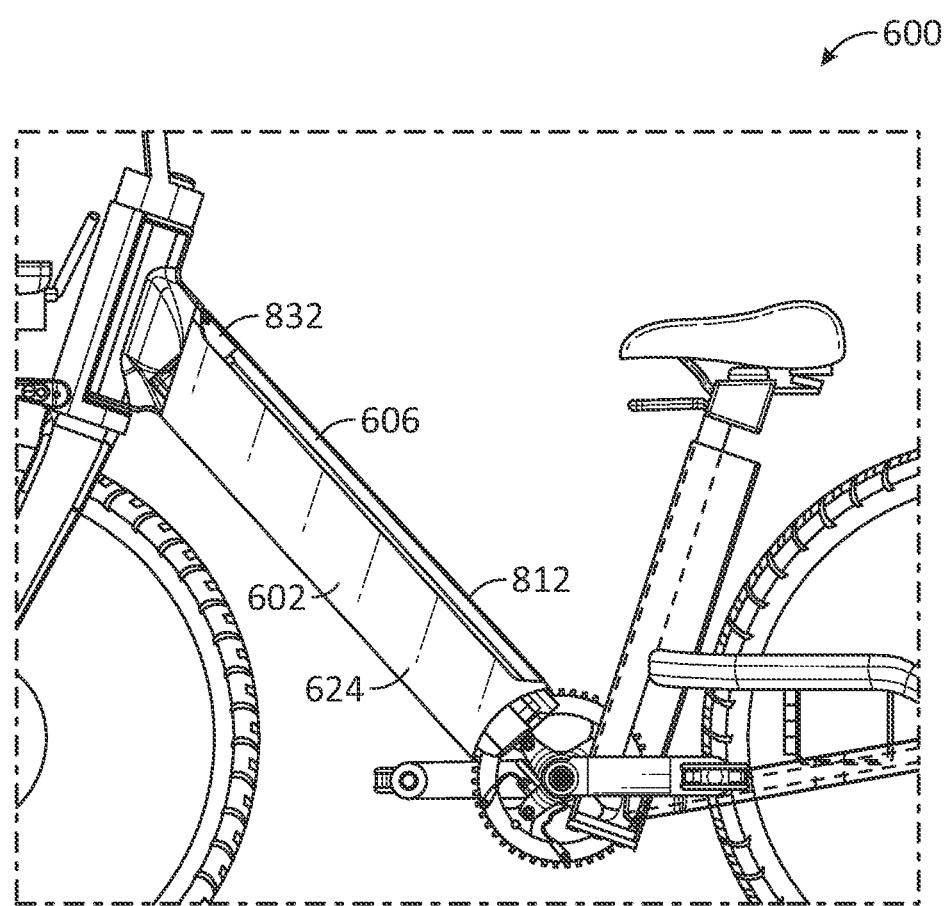
FIG. 14 illustrates a diagram of the battery locked within the recess of the downtube in accordance with an embodiment of the disclosure.

FIG. 12 illustrates a diagram of the battery 606 initially positioned within the recess 800 in accordance with an embodiment of the disclosure. FIG. 13 illustrates a diagram of the battery 606 further positioned within the recess 800 and positioned for engagement with the battery lock 850 in accordance with an embodiment of the disclosure. FIG. 14 illustrates a diagram of the battery 606 locked within the recess 800 in accordance with an embodiment of the disclosure. Referring to FIGS. 12-14, connection of the battery 606 will be discussed in further detail. Referring to FIG. 12, the battery 606 may include a lower portion 900 and an upper portion 902. The lower portion 900 includes the first end 820 of the enclosure 810. The upper portion 902 includes the second end 822 of the enclosure 810 and/or the shroud 832 defined by the outer wall 812. As shown in FIG. 12, the lower portion 900 of the battery 606 may be tuckable within the downtube 624 of the frame 602. For instance, the battery 606 may be carried by the handle 814 to the downtube 624 of the frame 602, at which point the first end 820 of the enclosure 810 is inserted or slid into the recess 800 and into the downtube 624 below the recess 800 and towards the bottom bracket 622. The first end 820 of the enclosure 810 may be inserted into the downtube 624 below the recess 800 until the step 830 of the battery 606 engages the downtube 624.

Referring to FIG. 13, once the first end 820 of the enclosure 810 is inserted into the recess 800 and into the downtube 624 of the frame 602, the upper portion 902 of the battery 606 may be moved (e.g., rotated) towards the headtube 620 of the frame 602. The upper portion 902 of the battery 606 may be engageable with the battery lock 850 to lock the battery 606 in place. For instance, the upper portion 902 of the battery 606 may be rotated towards the headtube 620 until the handle 814/striker 824 of the battery 606 is positioned for engagement with the battery lock 850 and the electrical connector 834 of the battery 606 is positioned for engagement with the power connector 860 within the recess 800. The upper portion 902 of the battery 606 may then be seated within the recess 800 to engage the handle 814/striker 824 with the battery lock 850 (e.g., with the latch 852) and to engage the electrical connector 834 with the power connector 860. Once the handle 814 (or striker 824) is engaged with the battery lock 850, the battery 606 may be locked to the micromobility transit vehicle 600 (see FIG. 14).

Referring to FIGS. 13 and 14, the outer wall 812 of the battery 606 may conceal the battery lock 850 when the battery 606 is locked in place. For example, the shroud 832 may conceal the attachment of the battery 606 to the battery lock 850, such as concealing the attachment of the handle 814 or striker 824 to the battery lock 850. As a result, the attachment between the battery 606 and the battery lock 850 may be protected from vandalism and damage, thereby reducing theft of the battery 606. In addition, the battery 606 may appear integrated with the frame 602 of the micromobility transit vehicle 600, making the battery 606 itself less noticeable.

FIG. 14 illustrates the battery 606 fully inserted within the downtube 624 of the frame 602. As shown in FIG. 14, the battery 606 may be receivable within the downtube 624 and the recess 800 to establish a continuous surface comprising one or more outer surfaces of the downtube 624 and one or more outer surfaces of the battery 606, such as to fit the battery 606 seamlessly or generally seamlessly within the recess 800. For instance, the outer wall 812 of the battery 606 may be shaped to establish the continuous surface when the battery 606 is received within the downtube 624 and the recess 800. Specifically, the outer wall 812 may have a shape complementary to the downtube 624 to establish the continuous surface. As described herein, "continuous surface" may refer to adjacent surfaces that are flush or substantially flush with one another, inclusive of any breaks, spaces, or interfaces between the adjacent surfaces. "Continuous surface" may also refer to adjacent surfaces that are aligned, conformed with one another, matched to one another, fitted to one another, integrated with one another, or the like.

Once the battery 606 is inserted into the downtube 624, the battery 606 may fill or generally fill the opening of the recess 800 such that the battery 606 is continuous or generally continuous with the profile of the downtube 624, with the attachment of the battery 606 to the downtube 624 concealed or hidden. As a result, the battery 606 (and battery connection) may be generally inconspicuous or unnoticeable, thereby discouraging theft, vandalism, or other damage to the battery 606. Such configurations may also streamline and/or reduce the form factor of the design of the micromobility transit vehicle 600. For example, positioning the battery 606 within the downtube 624 of the frame 602 may reduce the number of external accessories attached to the frame 602.

To remove the battery 606 from the downtube 624, the battery lock 850 is first unlocked, such as remotely via the management system 240 or via a mobile user device (e.g., user device 130) of a rider or service technician or manually via a button or override control. Once the battery lock 850 is unlocked, the upper portion 902 of the battery 606 may be rotated away from the downtube 624, such as via grasping the outer wall 812 (e.g., the shroud 832) and pulling the outer wall 812 away from the downtube 624. In some embodiments, the upper portion 902 of the battery 606 may be popped up or away from the downtube 624, such as automatically once the battery lock 850 is unlocked. For example, the battery 606 may be popped up or away from the downtube 624 by one or more springs, such as a leaf spring or a coil spring positioned between the battery 606 and the downtube 624. The handle 814 may then be grasped, and the battery 606 may be lifted out of the downtube 624 and the recess 800.

Figure 15:
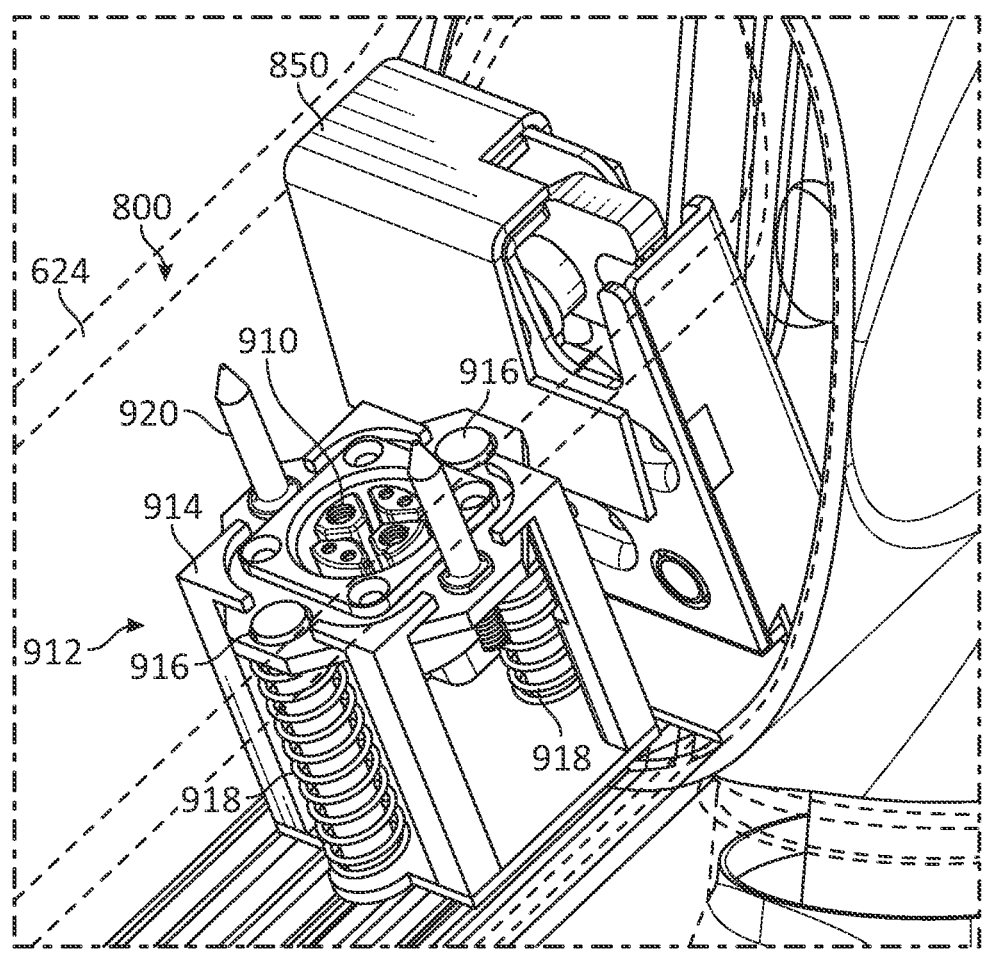
FIG. 15 illustrates a diagram of a power connector within the recess of the downtube in accordance with an embodiment of the disclosure.

FIG. 15 illustrates a diagram of a power connector 910 within the recess 800 of the downtube 624 in accordance with an embodiment of the disclosure. Except as otherwise noted below, the power connector 910 may be similar to the power connector 860 described above. For example, the power connector 910 may be positioned within the recess 800 disposed in the downtube 624 for engagement with the battery 606 when the battery 606 is positioned within the downtube 624 and the recess 800. As shown, the power connector 910 may be mounted on a spring assembly 912 such that the power connector 910 moves with the battery 606 (e.g., during battery insertion, during battery removal, during ride conditions, etc.).

The spring assembly 912 may include many configurations allowing the power connector 910 to move with the battery 606. As one example, the spring assembly 912 may include a plurality of posts 914 surrounding the power connector 910 and in sliding engagement of the power connector 910 to constrain movement of the power connector 910. For instance, the posts 914 may define a cage structure allowing the power connector 910 to slide up and down within the cage structure and along the posts 914. The spring assembly 912 may include one or more bosses 916 each with a flared terminal end. The power connector 910 may slidably engage the one or more bosses 916 such that the power connector 910 slides along the bosses 916 with movement of the battery 606. In some embodiments, the spring assembly 912 may bias the power connector 910 towards the flared terminal ends of the bosses 916. For instance, the spring assembly 912 may include one or more springs 918 biasing the power connector 910 towards the flared terminal ends of the bosses 916. In some embodiments, the springs 918 may be seated on the bosses 916. The springs 918 may maintain connection between the power connector 910 and the battery 606. In some embodiments, the springs 918 may function to pop the battery 606 up when the battery lock 850 is unlocked.

The power connector 910 may include other features for convenience. For example, the power connector 910 may include one or more alignment pins 920. The alignment pins 920 may be configured to mate with a portion of the battery 606 to align the power connector 910 with the battery 606, such as to align the power connector 910 with the electrical connector 834 of the battery 606. Such configurations may facilitate the battery 606 to be blind-mated to the power connector 910 as the battery 606 is inserted into the downtube 624.

Figure 16:
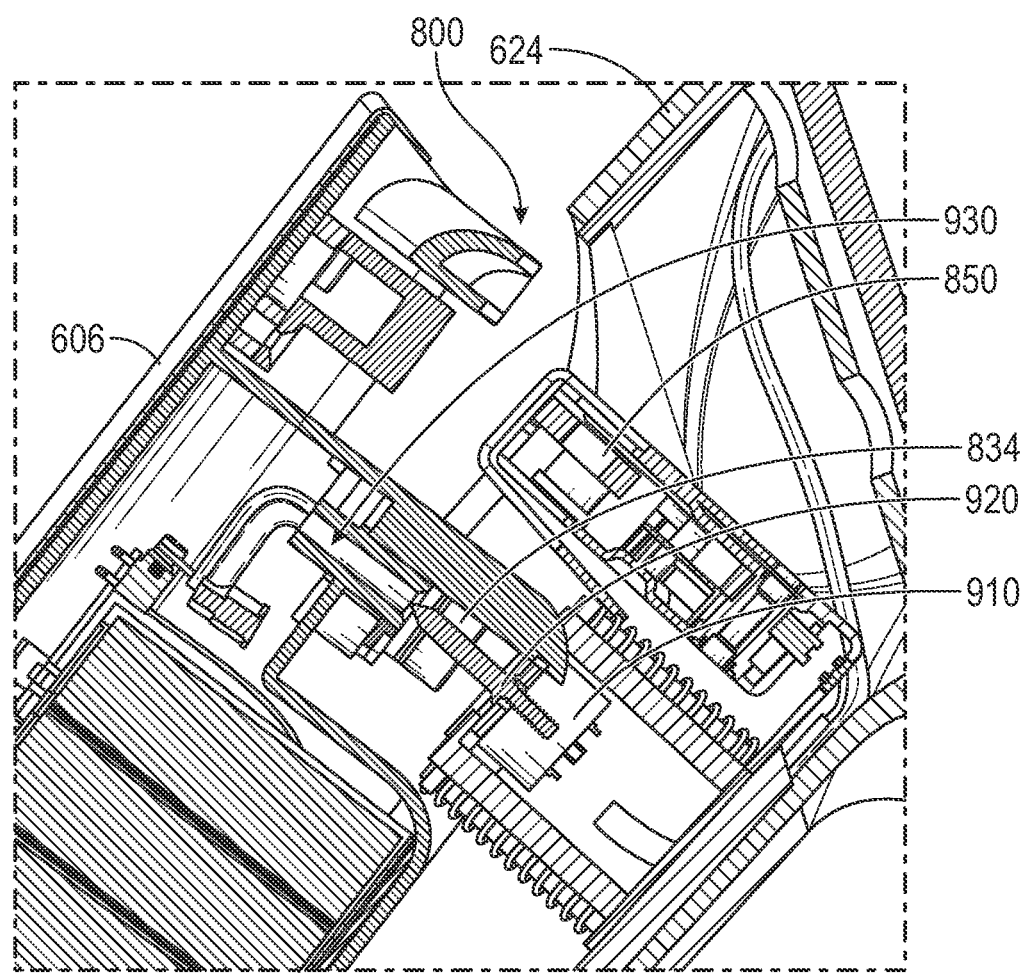
FIG. 16 illustrates a diagram of a connection between the battery and the power connector in accordance with an embodiment of the disclosure.

FIG. 16 illustrates a diagram of a connection between the battery 606 and the power connector 910 in accordance with an embodiment of the disclosure. Referring to FIG. 16, the battery 606 may include one or more apertures 930 configured to receive the one or more alignment pins 920 of the power connector 910 to align the power connector 910 with the electrical connector 834 of the battery 606. During insertion of the battery 606, the alignment pins 920 may first mate with the apertures 930 before electrical connection is made to align the power connector 910 with the electrical connector 834. Once aligned via receipt of the alignment pins 920 within the apertures 930, the power connector 910 may make electrical connection with the electrical connector 834 during further insertion of the battery 606.

Figure 17A:
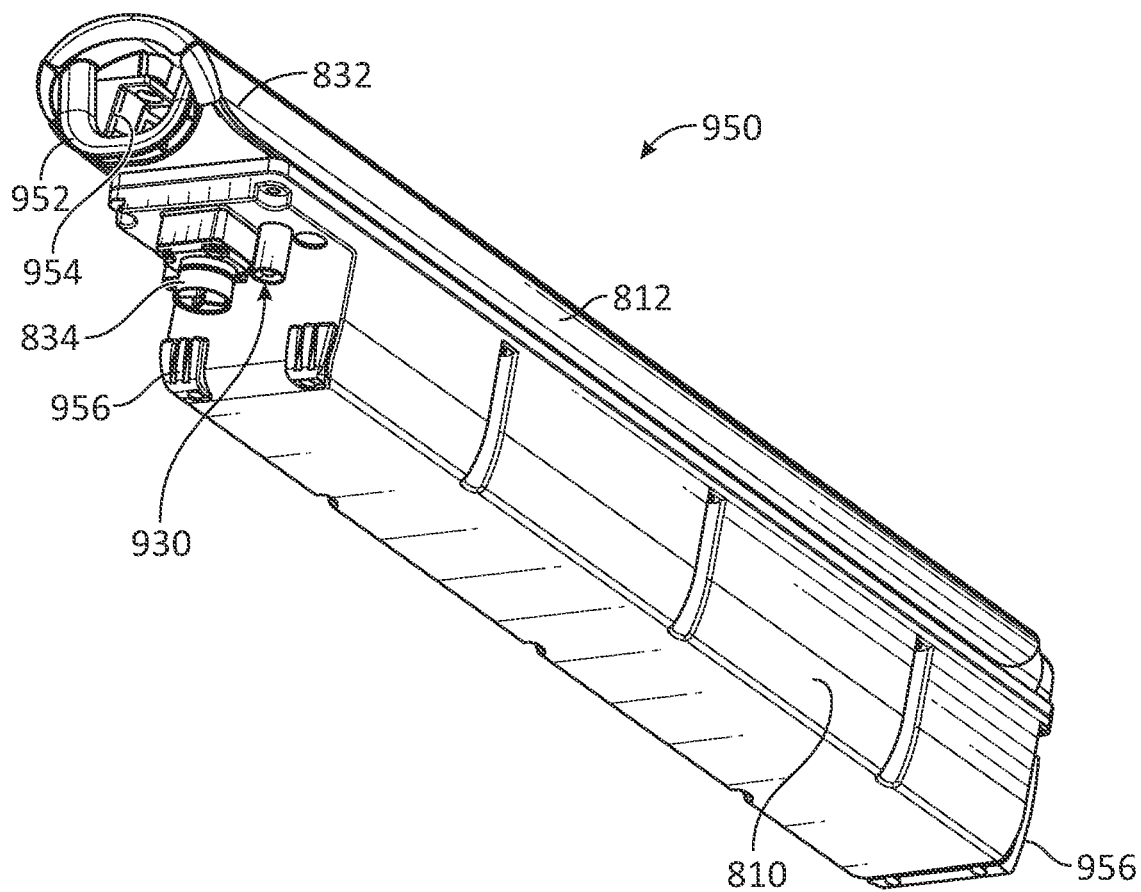
FIG. 17A illustrates a diagram of another battery for a micromobility transit vehicle in accordance with an embodiment of the disclosure.
Figure 17B:
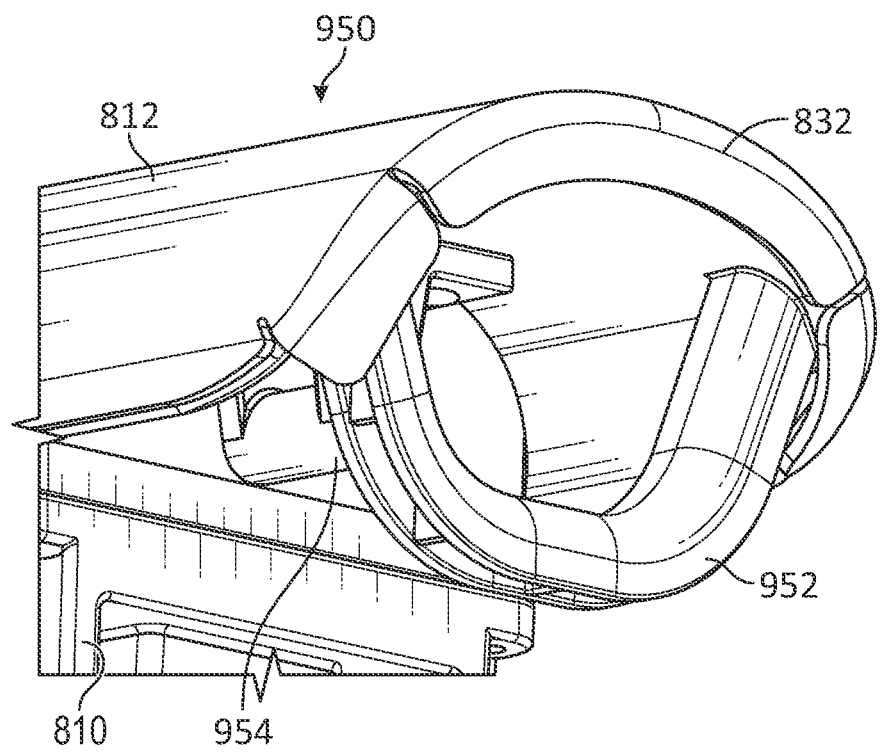
FIG. 17B illustrates an enlarged, fragmentary view of the battery of FIG. 17A in accordance with an embodiment of the disclosure.

FIG. 17A illustrates a diagram of another battery 950 in accordance with an embodiment of the disclosure. FIG. 17B illustrates an enlarged, fragmentary view of the battery 950 of FIG. 17A in accordance with an embodiment of the disclosure. Referring to FIGS. 17A and 17B, except as otherwise noted below, the battery 950 may be similar to the battery 606 described above. For instance, battery 950 may include enclosure 810 and outer wall 812 connected to the enclosure 810. The battery 950 may also include a handle 952 that extends from the outer wall 812, such as from the shroud 832. As shown, handle 952 may loop from the outer wall 812 (e.g., from the shroud 832), such as being formed as part of the outer wall 812. The battery 950 may also include a striker 954 for engagement with the battery lock 850. The striker 954 may extend from the outer wall 812. The striker 954 may be decoupled from the handle 952. The striker 954 may be positioned adjacent to the handle 952. In some embodiments, the battery 950 may include one or more bumpers 956. The bumpers 956 may be connected to the enclosure 810. The bumpers 956 may provide the battery 950 with drop protection and/or fit the battery 950 to the downtube 624 and/or recess 800.

Figure 18:
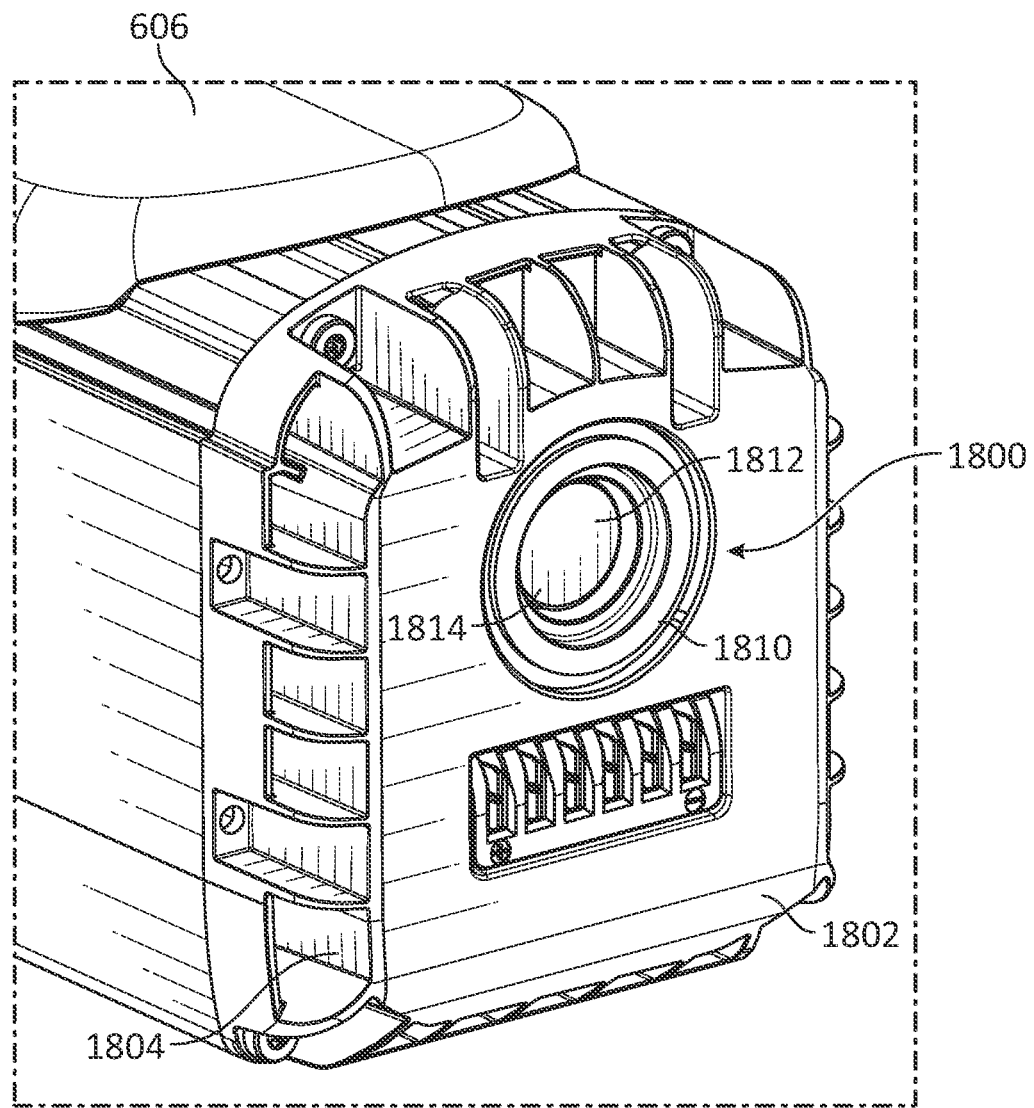
FIG. 18 illustrates a diagram of an end of a battery, in accordance with an embodiment of the disclosure.

FIG. 18 illustrates a diagram of an end of a battery, in accordance with an embodiment of the disclosure. Referring to FIG. 18, battery 606 may be configured to relieve or balance an internal pressure of the battery 606. For example, battery cell failure or other thermal event may produce gases or cause the internal pressure within battery 606 to increase. In embodiments, high pressure differentials to ambient conditions (e.g., during airplane transportation, etc.) may create a pressurization state of battery 606. To limit or prevent over pressurization, the battery 606 may include a ventilation assembly 1800 allowing airflow across its structure to relieve or balance the internal pressure of battery 606. For instance, the ventilation assembly 1800 may allow air or gases to enter or escape to balance the internal pressure to ambient conditions.

In embodiments, the ventilation assembly 1800 may be a passive system designed to safely relieve or balance the internal pressure. For example, ventilation assembly 1800 may be implemented without requiring any active electronics (e.g., a purely mechanical system). For instance, the ventilation assembly 1800 may passively allow airflow across its structure, such as passively allowing air to enter the battery 606 or exit the battery 606 to balance the battery's internal pressure to ambient conditions. In embodiments, the ventilation assembly 1800 may mechanically release under a threshold pressure to vent internal gases out of the battery during a ventilation event, as described below. For example, battery cell failure, battery cell damage, or other condition may produce excess gases within battery 606. In such conditions, the ventilation assembly 1800 may release to vent the gases from battery 606.

As shown in FIG. 18, battery 606 may include an enclosure or housing 1802. Housing 1802 may be similar to enclosure 810, described above. For instance, housing 1802 may define the outer structure of battery 606 and house one or more battery cells or other components of battery 606. The ventilation assembly 1800 may be disposed in the housing 1802. As shown, the ventilation assembly 1800 may be disposed in an end of the battery 606, such as in an end cap 1804 defining at least a portion of housing 1802.

Ventilation assembly 1800 may include many configurations allowing airflow across its structure. In embodiments, ventilation assembly 1800 may include a vent cap 1810 and a breather plug 1812. Vent cap 1810 may be releasably coupled to housing 1802 (e.g., to end cap 1804). Breather plug 1812 may be connected to the vent cap 1810. Breather plug 1812 may include a membrane 1814 configured to allow a transfer of air across its structure, such as between a first side of membrane 1814 and a second side of membrane 1814. For example, membrane 1814 may be configured to pass air between the housing 1802 and an external environment, such as to equalize a pressure within the housing 1802 with the external environment. In embodiments, membrane 1814 may be breathable but still operable to seal against dust and water intrusion.

Figure 19:
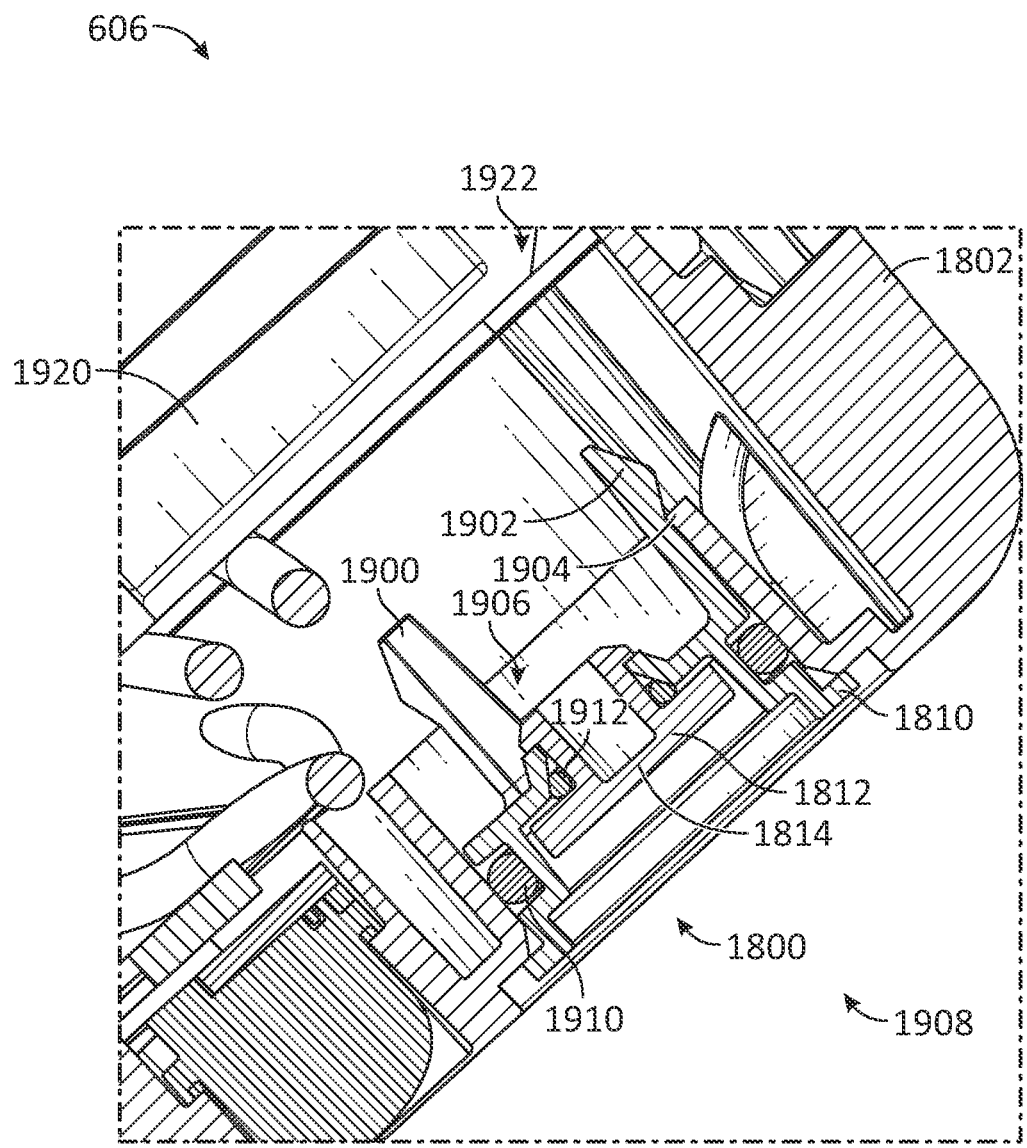
FIG. 19 illustrates a cross-sectional view of a ventilation assembly for battery and showing the ventilation assembly in a first configuration, in accordance with an embodiment of the disclosure.

FIG. 19 illustrates a cross-sectional view of ventilation assembly 1800 and showing the ventilation assembly 1800 in a first configuration, in accordance with an embodiment of the disclosure. In the first configuration, ventilation assembly 1800 may secured and sealed to housing 1802 to limit undesired fluid, dust, or debris ingress or egress. Referring to FIG. 19, ventilation assembly 1800 may be secured to housing 1802 in many configurations. For example, the vent cap 1810 may include a snap fitting 1900 configured to couple the vent cap 1810 to the housing 1802. As shown, snap fitting 1900 may include a plurality of fingers 1902 shaped to interlock with housing 1802, such as with a rim 1904 defining a bore 1906 through housing 1802. Breather plug 1812 may interlock with vent cap 1810, such as to a bore of vent cap 1810. Breather plug 1812 may be positioned such that membrane 1814 is able to pass air between the housing 1802 and an external environment 1908 to equalize a pressure within the housing 1802 with the external environment 1908. The external environment 1908 may be any environment external to housing 1802, such as the environment external to the housing 1802 and within the downtube 624 (i.e., the environment within the frame 602), the environment external to housing 1802 and frame 602 (e.g., an outside environment), or the like.

As shown, ventilation assembly 1800 may be secured within bore 1906, such that ventilation assembly 1800 does not extend beyond the end of battery 606. Vent cap 1810 may be sealed to the battery 606 (e.g., to the rim 1904 defined in housing 1800) with a first O-ring 1910 or other sealing structure. Breather plug 1812 may be sealed to vent cap 1810 with a second O-ring 1912 or other sealing structure. The first O-ring 1910 may limit or prevent passing of fluid, dust, or other debris between the vent cap 1810 and the rim 1904. Similarly, the second O-ring 1912 may limit or prevent passing of fluid, dust, or other debris between the vent cap 1810 and the breather plug 1812.

With continued reference to FIG. 19, the battery 606 may include battery cell block 1920. Depending on the application, battery cell block 1920 may include one or multiple battery cells coupled together. As shown, at least one air pocket 1922 may be disposed above or below the battery cell block 1920. The air pocket(s) 1922 may be configured to allow gas to travel to the ventilation assembly 1800, such as during a ventilation event. For example, air pocket(s) may fluidly connect the area above or below the battery cell block 1920 with ventilation assembly 1800 to ensure excess gases are vented from battery 606. Under normal operating conditions, air may flow across membrane 1814 to balance the internal pressure of battery 606.

Figure 20:
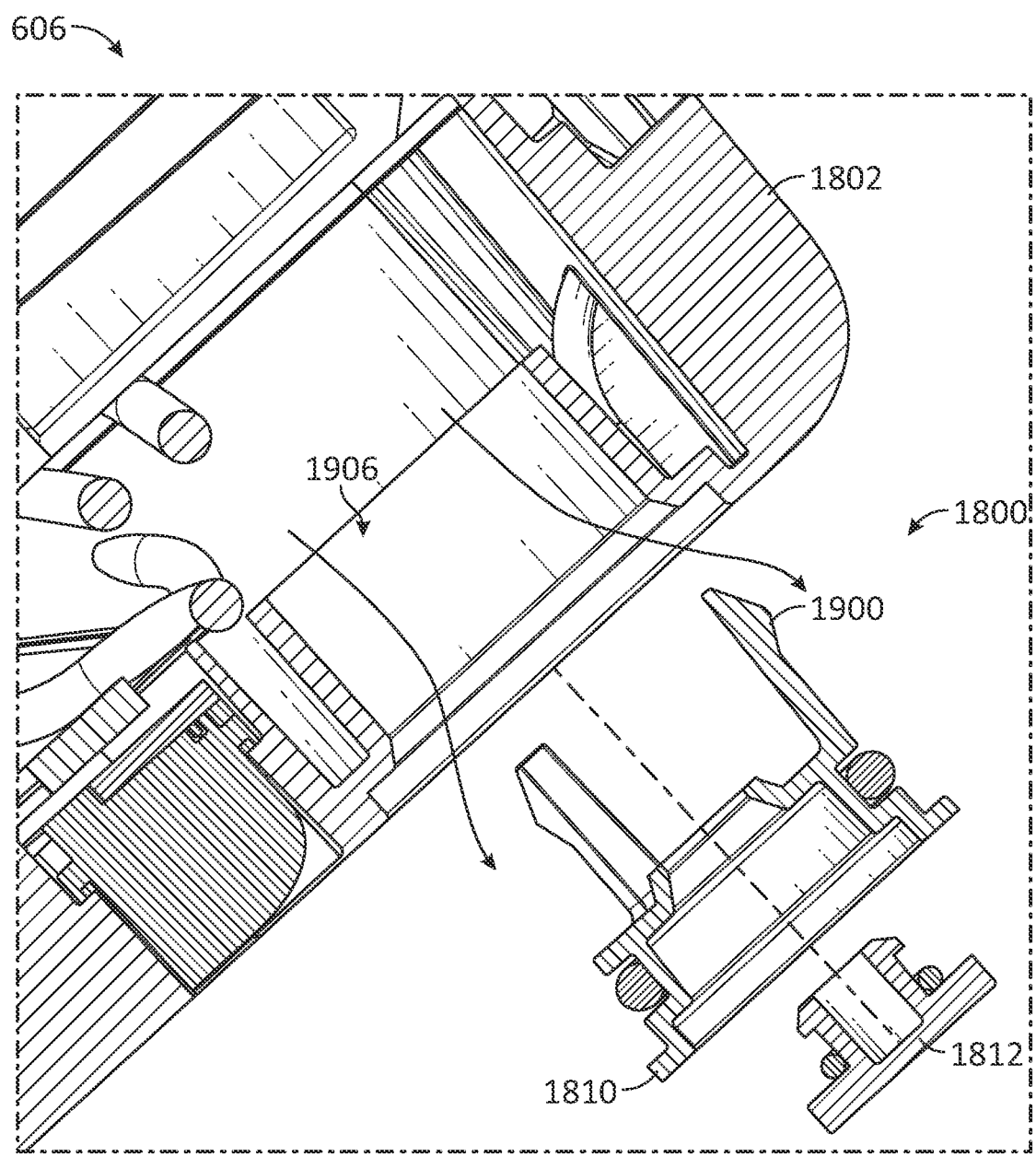
FIG. 20 illustrates a cross-sectional view of the ventilation assembly and showing the ventilation assembly in a second configuration following a ventilation event, in accordance with an embodiment of the disclosure.

FIG. 20 illustrates a cross-sectional view of the ventilation assembly 1800 and showing the ventilation assembly 1800 in a second configuration following a ventilation event, in accordance with an embodiment of the disclosure. In the second configuration, ventilation assembly 1800 may be released, at least partially, from battery 606 (e.g., from housing 1802). As described herein, the second configuration of ventilation assembly 1800 may allow internal gases to vent from battery 606. In the second configuration, ventilation assembly 1800 may release from battery 606 to allow internal gases to vent through bore 1906. For example, at least portions of the ventilation assembly 1800 may release in response to the pressure within the housing 1802 exceeding a threshold.

Referring to FIG. 20, one or both of vent cap 1810 and breather plug 1812 may be configured to release at a threshold pressure, such as at respective pressure. For example, the snap fitting 1900 may be configured to release under a threshold internal pressure of battery 606, causing the vent cap 1810 to pop out of housing 1802. For example, battery cell failure may cause the vent cap 1810 to release from battery 606, such as snap fitting 1900 releasing from housing 1802. The vent cap 1810 may mechanically release from the housing 1802 to vent internal gases out of the battery 606 in response to the pressure within the housing 1802 exceeding a threshold. For instance, when the pressure within housing 1802 exceeds a threshold, the snap fitting 1900 may release in response to the pressure to cause the vent cap 1810 to pop out of the battery 606 to vent internal gases out of battery 606. In embodiments, the membrane 1814 may allow a slow transfer of air, such that in a thermal or pressure event, pressure will build inside the battery 606 to cause the vent cap 1810 to release.

As shown, the breather plug 1812 may be configured to release from the vent cap 1810 under pressure. In embodiments, the vent cap 1810 may be configured to release from housing 1802 in response to the pressure within housing 1802 exceeding a first threshold, and the breather plug 1812 may be configured to release from vent cap 1810 in response to the pressure within housing 1802 exceeding a second threshold. Depending on the application, the second threshold may be greater than the first threshold, or the first threshold may be greater than the second threshold.

In some embodiments, at least a portion of the ventilation assembly 1800 may be configured to be reset following a ventilation event. For example, the vent cap 1810 may be reinserted or reset after internal gases are vented from battery 606. Specifically, vent cap 1810 may be reinserted until snap fitting 1900 reengages housing 1802. In embodiments, breather plug 1812 may be reinserted or reset following a ventilation event. For instance, breather plug 1812 may be recoupled to vent cap 1810 to reset ventilation assembly 1800. In some embodiments, vent cap 1810 and breather plug 1812 may be disposable parts, such that ventilation assembly 1800 needs to be replaced following a ventilation event.

Figure 21:
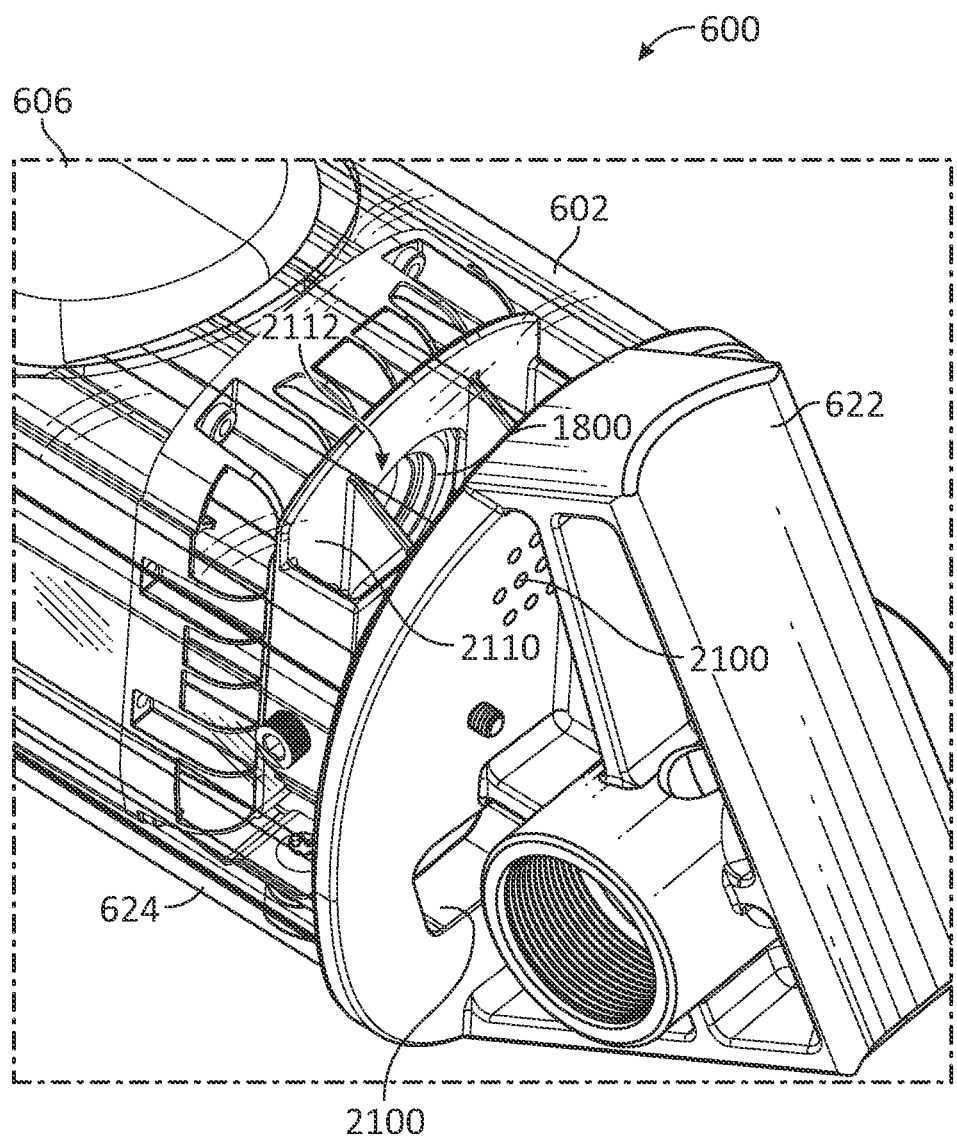
FIG. 21 illustrates a diagram of the battery positioned within the frame of micromobility transit vehicle and showing exhaust paths defined in the frame, in accordance with an embodiment of the disclosure.

FIG. 21 illustrates a diagram of battery 606 positioned within the frame 602 of micromobility transit vehicle 600 and showing exhaust paths defined in the frame 602, in accordance with an embodiment of the disclosure. Downtube 624 is shown transparent for illustration purposes. Referring to FIG. 21, battery 606 may be disposed at least partially in the downtube 624, such as in a manner as described above. For example, battery 606 may fit within downtube 624 to establish a continuous surface including one or more outer surfaces of downtube 624 and one or more outer surfaces of battery 606, as described above.

As shown, battery 606 may be positioned within the downtube 624 to vent internal gases downwardly through the frame 602. For example, frame 602 may include at least one exhaust path 2100, such as multiple exhaust paths 2100. The exhaust path(s) 2100 may be disposed in bottom bracket 622, although other configurations are contemplated. The exhaust path(s) 2100 may be disposed in frame 602 to vent the internal gases away from a rider of micromobility transit vehicle 600, such as towards the ground.

With continued reference to FIG. 21, a plate 2110 may be disposed in downtube 624. Battery 606 may be positioned against plate 2110, such as to locate battery 606 in downtube 624. The plate 2110 may include a hole 2112 through which vented gases may flow to the exhaust path(s) 2100. In some embodiments, a ventilation event may cause the ventilation assembly 1800 to contact plate 2110. For example, plate 2110 may define the extent of movement of ventilation assembly 1800 during a ventilation event.

Figure 22:
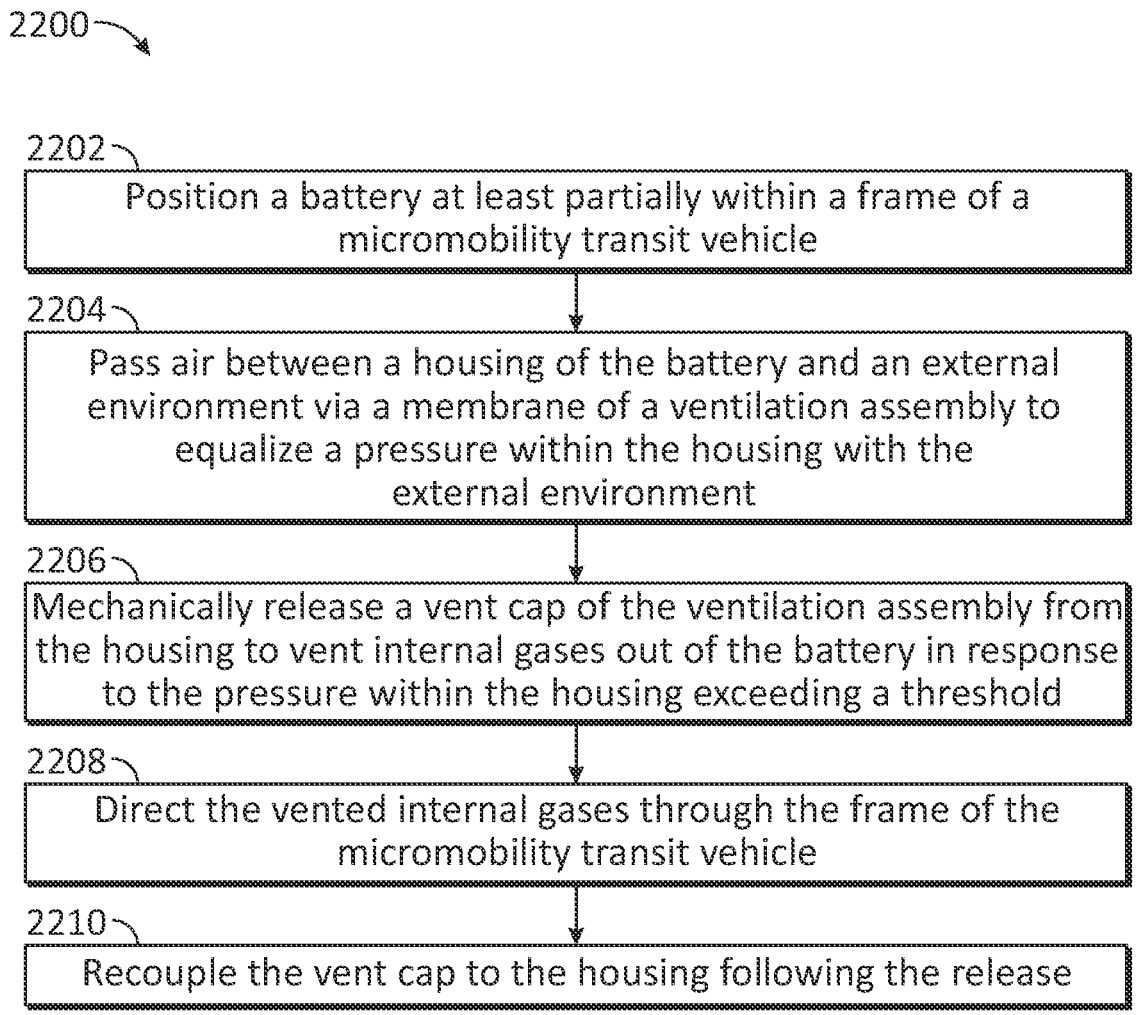
FIG. 22 illustrates a flow diagram of a process of venting internal gases from a battery, in accordance with an embodiment of the disclosure.

FIG. 22 illustrates a flow diagram of a process 2200 of venting internal gases from a battery for a micromobility transit vehicle, in accordance with an embodiment of the disclosure. It should be appreciated that any step, sub-step, sub-process, or block of process 2200 may be performed in an order or arrangement different from the embodiments illustrated by FIG. 22. For example, one or more blocks may be omitted from or added to the process 2200. Although process 2200 is described with reference to the embodiments of FIGS. 1-21, process 2200 may be applied to other embodiments. The micromobility transit vehicle and battery associated with process 2200 may be similar to micromobility transit vehicle 600 and battery 606 described above. For example, micromobility transit vehicle may be an electric bike or scooter, and battery may include a ventilation assembly.

In block 2202, process 2200 may include disposing a battery at least partially in a frame of a micromobility transit vehicle. For example, block 2202 may include disposing the battery in a downtube of the frame, such as in a manner as described above.

In block 2204, process 2200 may include passing air between a housing of the battery and an external environment via a membrane of a ventilation assembly, such as to equalize a pressure within the housing with the external environment. For example, membrane may be formed in or define a breather plug of ventilation assembly. The membrane may relieve or balance the internal pressure of battery to ambient conditions. In embodiments, the breather plug may be connected to a vent cap of ventilation assembly. The ventilation assembly may be disposed in the housing of the battery, such as in an end of the battery.

In block 2206, process 2200 may include mechanically releasing the vent cap from the housing to vent internal gases out of the battery in response to a pressure within the housing, such as in response to the pressure within the housing exceeding a threshold. For instance, battery failure, battery cell damage, or other conditions may release or produce gases within the battery. The internal gases may build up pressure within the battery until the pressure is sufficient to pop the ventilation assembly from the housing.

In block 2208, process 2200 may include directing the vented internal gases at least partially through the frame of the micromobility transit vehicle. For example, the vented internal gases may be vented through the downtube. In embodiments, the vented internal gases may be vented through one or more exhaust paths defined in the frame, such as in the downtube or a bottom bracket of frame. The above configurations may direct the vented internal gases downwardly towards the ground, such as to limit or prevent the gases being directed towards the rider of the micromobility transit vehicle.

In block 2210, process 2200 may include recoupling the vent cap to the housing following the release. For instance, the vent cap may be reinserted or reset after internal gases are vented from the battery. In embodiments, vent cap may be reinserted until a snap fitting of vent cap reengages the battery. In embodiments, breather plug may be recoupled to vent cap to reset the ventilation assembly. As a result, the ventilation assembly, or at least portions of ventilation assembly, may be reusable, although other configurations are contemplated.

Where applicable, various embodiments provided by the present disclosure can be implemented using hardware, software, or combinations of hardware and software. Also, where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as non-transitory instructions, program code, and/or data, can be stored on one or more non-transitory machine-readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

One or more features or functions described herein may be included or omitted, or enabled or disabled on an opt-in basis, particularly for optimizing rider safety, comfort, and reliability. For example, a rider may choose to turn on or turn off, or use or not use, one or more of the features or functions described herein for their personal safety and comfort. In some instances, these features or functions may be turned on temporarily and/or turned on automatically to maximize rider safety and comfort, among various other possibilities.

Embodiments described above illustrate but do not limit the invention. It should also be understood that numerous modifications and variations are possible in accordance with the principles of the invention. Accordingly, the scope of the invention is defined only by the following claims.

What is claimed is:

1. A micromobility transit vehicle comprising:
a frame comprising a downtube; and
a battery disposed at least partially in the downtube, the battery comprising:
a housing comprising a bore; and
a ventilation assembly disposed in the bore of the housing, the ventilation assembly comprising:
a vent cap comprising a snap fitting that releasably couples the vent cap within the bore of the housing of the battery, wherein the snap fitting comprises a plurality of fingers shaped to interlock with a rim defining the bore through the housing; and
a breather plug connected to the vent cap and comprising a membrane configured to pass air between the housing and an external environment to equalize pressure within the housing with the external environment,
wherein the snap fitting of the vent cap is configured to release from the bore of the housing when pressure within the housing of the battery exceeds a threshold, thereby causing the vent cap to pop out from the housing of the battery to allow internal gases to vent out of the battery through the bore.

2. The micromobility transit vehicle of claim 1, wherein pressure within the housing overcomes the snap fitting to cause the vent cap to pop out of the housing.

3. The micromobility transit vehicle of claim 1, wherein the threshold is a first threshold, wherein the breather plug is configured to release from the vent cap in response to the pressure exceeding a second threshold.

4. The micromobility transit vehicle of claim 1, wherein:
the vent cap is sealed to the housing with a first O-ring; and
the breather plug is sealed to the vent cap with a second O-ring.

5. The micromobility transit vehicle of claim 1, wherein the ventilation assembly is disposed in an end of the battery.

6. The micromobility transit vehicle of claim 1, wherein the vent cap is configured to be recoupled to the housing following the release.

7. The micromobility transit vehicle of claim 1, wherein:
the battery is positioned within the downtube to vent the internal gases downwardly through the frame; and
the frame comprises an exhaust path to vent the internal gases towards the ground.

8. A battery for a micromobility transit vehicle, the micromobility transit vehicle comprising a frame comprising a downtube, the battery being disposed at least partially in the downtube, the battery comprising:
a housing comprising a bore; and
a ventilation assembly disposed in the bore of the housing, the ventilation assembly comprising:
a vent cap comprising a snap fitting that releasably couples the vent cap within the bore of the housing of the battery, wherein the snap fitting comprises a plurality of fingers shaped to interlock with a rim defining the bore through the housing; and a breather plug connected to the vent cap and comprising a membrane configured to pass air between the housing and an external environment to equalize pressure within the housing with the external environment, wherein the snap fitting of the vent cap is configured to release from the bore of the housing when pressure within the housing of the battery exceeds a threshold, thereby causing the vent cap to pop out from the housing of the battery to allow internal gases to vent out of the battery through the bore.

9. The battery of claim 8, wherein the threshold is a first threshold, and wherein the breather plug is configured to release from the vent cap in response to the pressure exceeding a second threshold.

10. The battery of claim 8, wherein the ventilation assembly is disposed in an end of the battery.

11. The battery of claim 8, wherein the vent cap is configured to be recoupled to the housing following the release.

12. The battery of claim 8, further comprising:
a battery cell block; and
at least one air pocket disposed above or below the battery cell block to allow gas to travel to the ventilation assembly.

13. The battery of claim 8, wherein the ventilation assembly is positioned to vent gases downward towards the ground.

14. A method comprising:
disposing a battery at least partially in a downtube of a frame of a micromobility transit vehicle, the battery comprising:
a housing comprising a bore; and
a ventilation assembly disposed in the bore of the housing, the ventilation assembly comprising:
a vent cap comprising a snap fitting that releasably couples the vent cap within the bore of the housing of the battery, wherein the snap fitting comprises a plurality of fingers shaped to interlock with a rim defining the bore through the housing; and
a breather plug connected to the vent cap and comprising a membrane;

passing air between the housing of the battery and an external environment via the membrane of the ventilation assembly to equalize pressure within the housing with the external environment; and releasing the snap fitting of the vent cap from the bore of the housing when pressure within the housing of the battery exceeds a threshold, thereby causing the vent cap of the ventilation assembly to pop out from the housing of the battery to allow internal gases to vent out of the battery through the bore.

15. The method of claim 14, further comprising:
directing the vented internal gases at least partially through the frame.

16. The method of claim 15, wherein the directing the vented internal gases comprises venting the internal gases through one or more exhaust paths defined in the frame of the micromobility transit vehicle.

17. The method of claim 15, wherein:
the directing the vented internal gases comprises directing the vented internal gases at least partially through the downtube and towards the ground.

18. The method of claim 14, further comprising recoupling the vent cap to the housing following the release.

19. The micromobility transit vehicle of claim 1, wherein the vent cap comprises a second bore, and wherein the breather plug interlocks with the vent cap within the second bore of the vent cap.

20. The battery of claim 8, wherein the vent cap comprises a second bore, and wherein the breather plug interlocks with the vent cap within the second bore of the vent cap.

* * * * *